United States Patent
Lienke et al.

(10) Patent No.: US 12,515,650 B2
(45) Date of Patent: Jan. 6, 2026

(54) CONTROL SYSTEM AND CONTROL METHOD FOR SAMPLING BASED PLANNING OF POSSIBLE TRAJECTORIES FOR MOTOR VEHICLES

(71) Applicant: TRW AUTOMOTIVE GMBH, Aldorf (DE)

(72) Inventors: Christian Lienke, Dortmund (DE); Christian Wissing, Dortmund (DE); Manuel Schmidt, Dortmund (DE); Andreas Homann, Dortmund (DE); Torsten Bertram, Düsseldorf (DE); Markus Buss, Düsseldorf (DE); Martin Keller, Ratingen (DE); Karl-Heinz Glander, Monheim (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 697 days.

(21) Appl. No.: 17/289,758

(22) PCT Filed: Oct. 30, 2019

(86) PCT No.: PCT/EP2019/079696
§ 371 (c)(1),
(2) Date: Oct. 14, 2021

(87) PCT Pub. No.: WO2020/089311
PCT Pub. Date: May 7, 2020

(65) Prior Publication Data
US 2022/0080961 A1    Mar. 17, 2022

(30) Foreign Application Priority Data
Oct. 31, 2018    (DE) .................. 10 2018 008 624.1

(51) Int. Cl.
*B60W 30/095* (2012.01)
*B60W 30/12* (2020.01)
(Continued)

(52) U.S. Cl.
CPC ........ *B60W 30/0956* (2013.01); *B60W 30/12* (2013.01); *B60W 30/18163* (2013.01);
(Continued)

(58) Field of Classification Search
CPC ..................... B60W 10/00–2900/00
(Continued)

(56) References Cited

U.S. PATENT DOCUMENTS

| 2014/0200801 A1* | 7/2014 | Tsuruta | B60W 60/001 701/400 |
| 2015/0029092 A1* | 1/2015 | Holz | G06F 3/017 345/156 |

(Continued)

FOREIGN PATENT DOCUMENTS

| DE | 102015217891 A1 | 3/2017 |
| DE | 102016205442 A1 * | 10/2017 |
| DE | 102016211129 A1 | 12/2017 |

OTHER PUBLICATIONS

Sartini, T., Vendittelli, M., & Oriolo, G. (n.d.). A resolution-adaptive strategy for probabilistic motion planning. Proceedings of the 5th Biannual World Automation Congress.
(Continued)

*Primary Examiner* — Mohamed Abdo Algehaim
(74) *Attorney, Agent, or Firm* — Tarolli, Sundheim, Covell & Tummino LLP

(57) ABSTRACT

Systems and methods for sampling based planning of possible trajectories for motor vehicles are provided. For example, a control system is configured to determine information relating to a current driving situation of the subject
(Continued)

motor vehicle and at least one other motor vehicle on the basis of the environment data. The control system is also configured to determine a plurality of lateral positions. The control system is further configured to determine a number of longitudinal positions and/or speeds. The control system is yet further configured to sample the plurality of lateral positions and the number of longitudinal positions and/or speed in curvilinear coordinates and transformed based on the reference lane to determine stopping points for a trajectory. The control system is configured to determine the trajectory for the subject motor vehicle utilizing a spline-based interpolation in orthogonal coordinates between the determined stopping points and corresponding to the lateral positions.

13 Claims, 15 Drawing Sheets

(51) Int. Cl.
*B60W 30/18* (2012.01)
*B60W 50/00* (2006.01)

(52) U.S. Cl.
CPC ....... *B60W 50/00* (2013.01); *B60W 2050/006* (2013.01); *B60W 2520/10* (2013.01); *B60W 2520/105* (2013.01); *B60W 2552/53* (2020.02); *B60W 2554/20* (2020.02); *B60W 2554/4041* (2020.02); *B60W 2554/4042* (2020.02)

(58) Field of Classification Search
USPC .......................................................... 701/26
See application file for complete search history.

(56) References Cited

U.S. PATENT DOCUMENTS

| | | | |
|---|---|---|---|
| 2015/0346723 A1* | 12/2015 | Pedersen | G05D 1/0217 701/25 |
| 2017/0003685 A1* | 1/2017 | Pollock | G05D 1/0212 |
| 2017/0053532 A1* | 2/2017 | Madas | B60W 30/09 |
| 2017/0083021 A1* | 3/2017 | Balaghiasefi | G05D 1/0274 |
| 2017/0120912 A1* | 5/2017 | Ishioka | B60W 30/16 |
| 2017/0326981 A1* | 11/2017 | Masui | G01S 13/86 |
| 2017/0334453 A1* | 11/2017 | Mimura | B60W 30/18 |
| 2018/0059670 A1* | 3/2018 | Nilsson | G08G 1/167 |
| 2018/0099667 A1* | 4/2018 | Abe | G08G 1/167 |
| 2018/0150081 A1* | 5/2018 | Gross | G05D 1/0217 |
| 2018/0238696 A1* | 8/2018 | Takeda | G01C 21/3694 |
| 2018/0284785 A1* | 10/2018 | Berntorp | G08G 1/166 |
| 2018/0292834 A1* | 10/2018 | Kindo | B60W 60/0011 |
| 2019/0084561 A1* | 3/2019 | Takeda | B60W 40/072 |
| 2019/0179320 A1* | 6/2019 | Pacala | G05D 1/0214 |
| 2019/0227552 A1* | 7/2019 | Kato | G05D 1/0088 |
| 2019/0243372 A1* | 8/2019 | Huval | G05D 1/0214 |
| 2019/0275946 A1* | 9/2019 | Hirata | B60R 1/00 |
| 2019/0302771 A1* | 10/2019 | Borkowski | G01S 13/931 |
| 2019/0302800 A1* | 10/2019 | Martens | B60W 30/095 |
| 2019/0310644 A1* | 10/2019 | Zhang | G05D 1/0217 |
| 2019/0355257 A1* | 11/2019 | Caldwell | G08G 1/0112 |
| 2020/0033871 A1* | 1/2020 | Kato | B60W 60/0053 |
| 2020/0057447 A1* | 2/2020 | Kato | B60W 30/16 |
| 2020/0086837 A1* | 3/2020 | Le Cornec | G01C 21/3407 |
| 2020/0086855 A1* | 3/2020 | Packer | B60W 60/00276 |
| 2020/0096359 A1* | 3/2020 | Sakr | G01C 21/3446 |
| 2020/0172100 A1* | 6/2020 | Kato | G08G 1/16 |
| 2020/0379461 A1* | 12/2020 | Singh | G06N 3/044 |
| 2021/0223384 A1* | 7/2021 | Shimizu | G01S 13/58 |
| 2021/0389770 A1* | 12/2021 | Varnhagen | B60W 30/09 |
| 2022/0024505 A1* | 1/2022 | Batchelor | B61L 25/025 |
| 2025/0136104 A1* | 5/2025 | Wadman | G08G 1/0112 |

OTHER PUBLICATIONS

PCT International Search Report for corresponding International Application Serial No. PCT/EP2019/079696, mailed Feb. 18, 2020, pp. 1-5.

German Search Report for corresponding German Application Serial No. 10 2018 008 624.1, mailed Oct. 4, 2019, pp. 1-8.

* cited by examiner

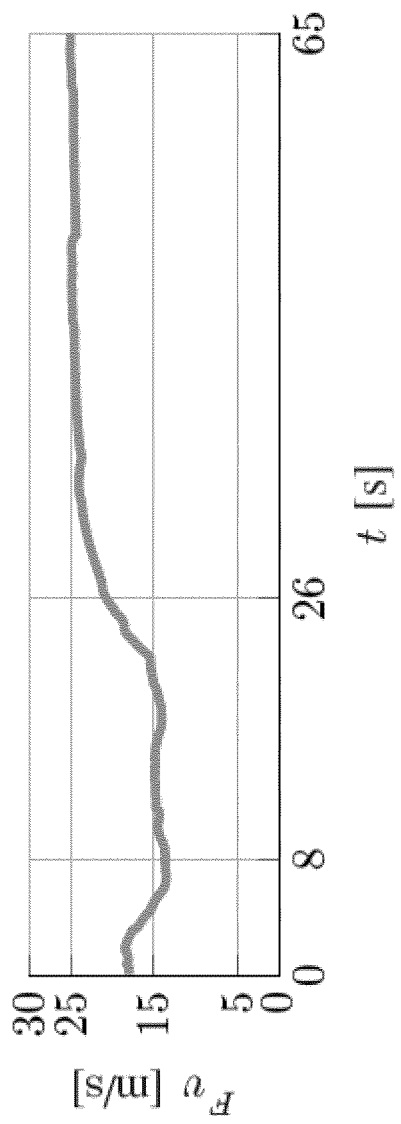

CONTROL SYSTEM AND CONTROL METHOD FOR SAMPLING BASED PLANNING OF POSSIBLE TRAJECTORIES FOR MOTOR VEHICLES

BACKGROUND OF THE INVENTION

Here a control system and a control method for determining a trajectory, which a subject vehicle is to follow to carry out a driving maneuver, are described. The control system and the control method are based in particular on an environment sensor in the subject motor vehicle and support a driver or an autonomous motor vehicle. In the case of semi-autonomous motor vehicles and autonomously controlled motor vehicles, this helps to increase the safety and driving comfort of the occupants of the motor vehicle.

PRIOR ART

The increasing interest in various functions of self-driving motor vehicles has led to an increased need for reliable and fast control systems and algorithms for motion planning (trajectory planning) of at least semi-autonomous motor vehicles. A major challenge is not only the growing number of road users, but also the cognitive tasks that road users have to perform in highly complex traffic scenarios. In the architecture of control systems of semi-autonomous or autonomous vehicles, in addition to the detection and control of certain traffic situations, decision-making and movement planning have a major influence on the overall performance of the corresponding motor vehicle.

In recent years, increasingly developed control systems and algorithms for trajectory planning of partially (autonomous) motor vehicles testify to the complexity of automated driving. The challenge regarding motion planning is usually to determine a comfortable and also executable and collision-free trajectory in a limited time, in order to ensure real-time performance of the partially (autonomous) systems of the motor vehicle in a dynamically changing environment.

In the past, various approaches to trajectory planning have been developed. These are, for example, motion planning algorithms or techniques for sampling-based trajectory planning. The latter usually uses certain simplifications of the movement planning problem to meet certain requirements for limited computing time, for example. The (simplification) goal is to cover a continuous space with a finite number of samples (sampling values).

In today's motor vehicles, advanced driver assistance systems (ADAS) offer a variety of monitoring and indication functions to make driving of motor vehicles safer. The environment of the motor vehicle will be monitored in relation to the course of the subject vehicle's journey, based on environment data obtained from one or more environment sensors present on the motor vehicle.

Well-known driving assistance systems, for example, determine whether the vehicle is within a lane and whether the driver is inadvertently drifting to one side of the lane or is about to leave it. These driving assistance systems generate an "image" of the road and in particular of the lane from the generated environment data. Objects are detected and tracked while driving, such as a curb, lane boundary lines, direction arrows, etc.

Also so-called "blind spot monitors" belong to today's driving assistance systems. They determine, for example by means of radar, lidar, video or the like, whether another motor vehicle, a road user or an object is to the side of and/or behind the motor vehicle, so that a change of lane or turning of the subject motor vehicle could lead to a collision with it.

Furthermore, in so-called ACC (Adaptive Cruise Control) systems, an automatic speed control of the subject motor vehicle is adapted to the speed of a vehicle in front. A certain distance should always be maintained from the vehicle in front. For this purpose, such systems determine a direction of movement and/or a speed of the vehicle in front in order to prevent the subject motor vehicle from crossing the path of the vehicle in front in such a way as to create a critical situation. This applies on the one hand to lane changes or turning processes and on the other hand to rear-end collisions.

In vehicles controlled by persons, driver assistance systems usually provide a warning function to warn the driver of a critical situation or maneuver, or to propose to the driver a suitable maneuver for the motor vehicle. Similarly, driver assistance systems can also be used in autonomously controlled vehicles in order to provide the autonomous controller with the appropriate environment data.

Underlying Problem

In road traffic, situations may occur which require a driver or a (partially) autonomous driver assistance system of a subject motor vehicle to perform a driving maneuver. For example, a curved lane course may even require a corresponding driving maneuver of the subject motor vehicle.

However, the current situation in which the subject motor vehicle finds itself is not constant but in reality is constantly changing. For example, other road users may, intentionally or unintentionally, change lanes or change speeds as a result of an accident. In addition, the current driving situation of the subject motor vehicle even changes due to its own driving behavior and/or the changing course of the lane. Responding appropriately and in a timely manner to such changes of the current situation is a major challenge for both traditional driver assistance systems and human drivers. The dynamics of many traffic situations and the increasingly dense traffic are also reflected in an increasing use of resources by conventional driver assistance systems.

It is therefore the objective to provide a control system and a control method for a motor vehicle which increase the driving safety and the driving comfort of the motor vehicle according to a current traffic situation in which the motor vehicle finds itself. It also aims to save resources for the control system by efficiently calculating trajectories for subsequent driving maneuver decisions for the motor vehicle.

Proposed Solution

This objective is achieved by a control system with the features of claim 1 as well as a control method with the features of claim 12.

Preferred embodiments are apparent from the subordinate claims 2 to 11 and 13 as well as the following description.

One aspect concerns a control system set up and designed for use in a subject motor vehicle. This control system detects lanes, road boundaries, road markings, other motor vehicles and/or other different objects based on environment data obtained from at least one of the environment sensors associated with the subject motor vehicle. The at least one environment sensor is set up to provide an electronic controller of the control system with environment data which reflects the region in front of, laterally adjacent to and/or behind the subject motor vehicle. The control system is at least set up and designed to obtain information relating to a current driving situation of the subject motor vehicle and at least of another motor vehicle based on the environment data provided. Furthermore, the control system is set up and designed at least to determine a plurality of lateral positions based on the information relating to the current driving situation of the subject motor vehicle and/or of the other motor vehicle and to determine a number of longitudinal positions and/or speeds based on the information relating to the current driving situation of the subject motor vehicle and/or of the other motor vehicle. Finally, the control system is also set up and designed to determine, from the plurality of lateral positions and the plurality of longitudinal positions and/or speeds, stopping points for a trajectory for the subject motor vehicle which the subject motor vehicle is to follow when performing a driving maneuver and to determine the trajectory for the subject motor vehicle by means of a spline-based interpolation between the determined stopping points and according to the lateral positions at the stopping points.

When determining the lanes, road boundaries, road markings, other motor vehicles and/or other different objects, the control system may be set up and designed, for example, to identify a lane on which the subject motor vehicle is located and another lane in which another motor vehicle is in the region in front of, laterally adjacent to and/or behind the subject motor vehicle, and to determine the other motor vehicle in the region in front of, laterally adjacent to and/or behind the subject vehicle as another motor vehicle to be captured. The further lane may correspond to the particular lane or may be adjacent to the particular lane. This will ensure that a further vehicle travelling both in the same lane as the subject motor vehicle and on a lane adjacent to the lane of the subject motor vehicle will be determined as the other motor vehicle to be captured.

In addition, in particular lateral movements (of the longitudinal axes) of the subject motor vehicle and/or of the other motor vehicle towards a lane boundary of a lane on which the subject motor vehicle and/or the other motor vehicle is located can be determined. In particular, the control system may be used to determine a further motor vehicle as the other motor vehicle which is in front of and/or behind and/or laterally in front of and/or laterally behind the subject motor vehicle and has the shortest distance from the subject motor vehicle in the current driving situation (at the current time).

The control system can determine the particular lane as well as the further lane, for example, on the basis of the provided environment features, such as lane boundaries and/or lane markings. The control system can also detect these environment features based on the environment data obtained by means of the at least one environment sensor. In addition, the control system can also be provided with the environment features by an external system, such as a GPS system.

The other motor vehicle may be captured by means of the at least one environment sensor of the subject motor vehicle over a predetermined period of time or continuously and the corresponding data may be provided to the control system of the subject motor vehicle. In doing so, the control system may be set up and designed to determine, during a predetermined period of time or continuously, a change in a distance between a longitudinal axis of the other motor vehicle and a centre line, at least one lane boundary or at least one lane marking of the associated lane on which the other motor vehicle is located. The center line and the lane boundary of the associated lane can be a virtual current center line or current lane boundary of the associated lane determined by the control system. Similarly, during the predetermined period of time or continuously, the control system may determine a change in the distance between a longitudinal axis of the other motor vehicle and a virtual or real lane marking or lane boundary on which the subject motor vehicle is located.

The control system may be set up and designed to determine a distance between the subject motor vehicle and another motor vehicle in front of, laterally adjacent to and/or behind the subject motor vehicle, and a speed difference and/or an acceleration difference between the subject motor vehicle and the other motor vehicle, wherein the subject motor vehicle and the other motor vehicle can be located in the same lane or in adjacent lanes.

The determined distances, speed differences and/or acceleration differences between the subject motor vehicle and the other motor vehicle can be combined arbitrarily and set in relation to each other by the control system.

It is understood that the control system may also be set up and designed to capture the other motor vehicles participating in traffic by means of the at least one environment sensor over a predetermined period of time or continuously in order to determine the current traffic situation. Thus, the control system can also determine changes of the previously described relative distances, speed differences and/or acceleration differences over a predetermined period of time or continuously, wherein this includes all other motor vehicles or other objects which are in a current traffic situation in the immediate vicinity of the subject motor vehicle.

For certain embodiments, the system may also be set up and designed, based on the provided environment data, to determine a basic driving maneuver, which the subject motor vehicle is to carry out, and to determine at least one of the plurality of lateral positions based on the determined basic maneuver and/or to assign at least one of the lateral positions a value which characteries a basic maneuver class, wherein the basic maneuver class is contained in a set of basic maneuver classes composed at least of basic maneuvers for a lane change to the left, a lane change to the right and lane keeping.

Alternatively or additionally, the set of basic maneuver classes may contain the further basic maneuvers lane keeping on the left and/or lane keeping on the right.

The control system may also be set up and designed to determine the plurality of longitudinal positions based on a longitudinal acceleration of the subject motor vehicle and/or of the other motor vehicle.

This may be, for example, a maximum possible acceleration of the subject motor vehicle based on the engine power of the subject motor vehicle. Alternatively or additionally, these may be maximum acceleration values of the subject motor vehicle and/or the other motor vehicle derived from safety and comfort considerations, which are based on the current driving situation or may otherwise be predetermined in an appropriate manner.

In certain embodiments, the control system may be set up and designed to determine the plurality of longitudinal positions by means of adaptive discretization, wherein an acceleration of the subject motor vehicle and/or of the other motor vehicle is used as a control parameter for adaptive discretization.

This may be, for example, one of the longitudinal and/or lateral accelerations described above or corresponding maximum values in each case.

Furthermore, this may be in particular the acceleration in the direction of travel of the subject motor vehicle and/or in the direction of travel of the other motor vehicle at the respective time of determination of the current driving situation of the subject motor vehicle and/or of the other motor vehicle.

By means of the adaptive discretization, a nonlinear image of the linearly sampled longitudinal positions and/or speeds of the subject motor vehicle and/or of the other motor vehicle may be produced.

In addition, adaptive discretization can be used, in particular when evaluating a rear impact scenario on a highway and/or expressway, to take into account varying longitudinal accelerations of the subject motor vehicle and/or of the other motor vehicle in determining the trajectory for the subject motor vehicle.

The control system may also be set up and designed to determine the trajectory for the subject motor vehicle, taking into account a static collision check, wherein the static collision check is based on the plurality of lateral positions of the subject motor vehicle and/or of the other motor vehicle.

The control system may further be set up and designed to determine the trajectory for the subject motor vehicle taking into account a dynamic collision check, wherein the dynamic collision check is based on the plurality of lateral positions and/or on the plurality of longitudinal positions and/or speeds of the subject motor vehicle and/or of the other motor vehicle.

In this respect, the control system may also be set up and designed to carry out the dynamic collision check taking into account the maximum acceleration of the subject motor vehicle and/or of the other motor vehicle.

In this case, the control system may further be set up and designed to perform the static collision check and/or the dynamic collision check using the separation theorem.

The control system may also be set up and designed to check the trajectory for the subject motor vehicle by means of a target function based on a cost function.

A target state can be assigned to the target function, and deviation(s) of the target function from the target state can be used as targets of the target function. Alternatively or additionally, other targets of the target function in the form of the lateral and/or longitudinal acceleration of the subject motor vehicle and/or in the form of the lateral and/or longitudinal jolt of the subject motor vehicle can be used as target states of the target function.

Thus, a comprehensive holistic target function can be determined, the individual terms of which model the dynamic collision avoidance, the static collision avoidance, the feasibility as well as the driving comfort for the current traffic situation of the subject motor vehicle 12, in order to select the trajectory for the subject motor vehicle for each current driving situation and for each maneuver class.

The control system may further be set up and designed to determine the plurality of lateral positions and/or the plurality of longitudinal positions and/or speeds for the subject motor vehicle and/or for the other motor vehicle in curvilinear coordinates with respect to a reference lane provided to the control system of the subject motor vehicle by the environment data, and to check the trajectory for the subject vehicle in orthogonal coordinates.

The interpolation can also be carried out in orthogonal coordinates.

This allows trajectory planning to be carried out independently of the road geometry for driving on straight and winding road sections.

In contrast to the evaluation of the candidate trajectories in curvilinear coordinates, as a result time-consuming point-wise transformation of trajectories determined for obstacles (for example the other motor vehicle) is therefore unnecessary. In addition, the transformation of the stopping points alone with interpolation and evaluation into orthogonal coordinates (motor vehicle coordinates) allows that not every single trajectory point has to be transformed. For reasons of accuracy, the resolution of the stopping points can be selected according to the road curvature, thereby minimizing a deviation from a reference track (reference trajectory) caused by the interpolation.

The control system can further be set up and designed to determine the trajectory by means of a target function based on a cost function.

The control system may further be set up and designed to carry out a static collision check in determining the trajectory for the subject motor vehicle. This static collision check is based on the plurality of first sampling values.

The control system may also be set up and designed to carry out a dynamic collision check in determining the trajectory for the subject motor vehicle. The dynamic collision check is based on the plurality of second sampling values.

The control system may further be set up and designed to carry out the dynamic collision check taking into account the maximum acceleration of the subject motor vehicle.

In this case, the control system may further be set up and designed to carry out the static collision check and/or the dynamic collision check using the separation theorem.

A further aspect concerns a control method which detects road boundaries, road markings, other motor vehicles and/or objects in a region in front of, laterally adjacent to and/or behind a subject motor vehicle in the subject motor vehicle based on environment data obtained from at least one of the environment sensors assigned to the subject motor vehicle, wherein the control method is carried out in particular by means of a control system described above. The control method includes at least the steps:

determining information relating to a current driving situation of the subject motor vehicle and at least one other motor vehicle based on the environment data provided, determining a plurality of lateral positions based on information relating to the current driving situation of the subject motor vehicle and/or of the other motor vehicle, determining a plurality of longitudinal positions and/or speeds based on information relating to the current driving situation of the subject motor vehicle and/or of the other motor vehicle, determining stopping points for a trajectory for the subject motor vehicle which is to be followed by the subject motor vehicle when performing a driving maneuver, and Determining the trajectory for the subject motor vehicle by means of a spline-based interpolation between the determined stopping points and according to the lateral positions at the stopping points.

Another aspect concerns a motor vehicle which includes a control system described above.

Compared to conventional driver assistance systems, the solution presented here improves a correct estimation and a correct recognition of the current driving situation of the subject motor vehicle and further motor vehicles. In addition, a two-stage planning and evaluation approach for trajectory candidates, executed in real time, is provided, which enables an exact and efficient determination of the best possible (optimum) trajectory for a future driving maneuver of the subject motor vehicle.

This best possible trajectory can therefore be determined as an appropriate response to the current traffic situation in which the subject motor vehicle finds itself. The environment data obtained by means of the at least one environment sensor constantly change according to the real traffic and driving situation and can be updated cyclically.

If the best possible trajectory is used for a future driving maneuver of the subject motor vehicle, this increases the driving comfort and the driving safety of the subject motor vehicle, as not only static and dynamic collision checks are carried out, but also the driving dynamics of the subject motor vehicle are taken into account when determining the trajectory. The control system can also ensure the dynamic feasibility of the best possible trajectory, which additionally increases driving safety. In addition, in other embodiments of the control system, the driving behavior of the subject motor vehicle can be optimized when following the trajectory by taking into account the driving dynamics of the subject motor vehicle. The driving dynamics are, for example, the longitudinal acceleration and the lateral acceleration of the subject motor vehicle.

It is clear to the person skilled in the art that the previously described aspects and features can be combined arbitrarily in a control system and/or a control method. Although some of the features described above have been described with respect to a control system, it is understood that these features may also apply to a control method. Similarly, the features described above in relation to a control method may apply in a corresponding manner to a control system.

BRIEF DESCRIPTION OF THE DRAWING

Further objectives, features, advantages and possible applications arise from the following description of exemplary embodiments, which are to be considered non-restrictive, with reference to the corresponding drawings. In doing so, all described and/or figuratively illustrated features illustrate the object disclosed here by themselves or in any combination. The dimensions and proportions of the components shown in the figures are not to scale. Identical or functionally identical components are provided with the same reference characters.

FIG. 15 shows schematically the speed of the motor vehicle during the approach from the rear scenario shown in FIGS. 13 and 14 on a highway.

DETAILED DESCRIPTION OF THE DRAWINGS

In the context of the following disclosure, certain aspects are described primarily with regard to the control system. However, these aspects are of course also valid in the context of the disclosed control method, which can be carried out, for example, by a central control device (ECU) of a motor vehicle. This can be done by making appropriate write and read accesses to a memory assigned to the motor vehicle. The control method may be implemented within the motor vehicle both in hardware and software as well as a combination of hardware and software. This includes digital signal processors, application-specific integrated circuits, field programmable gate arrays, and other suitable switching and computing components.

Figure 1:
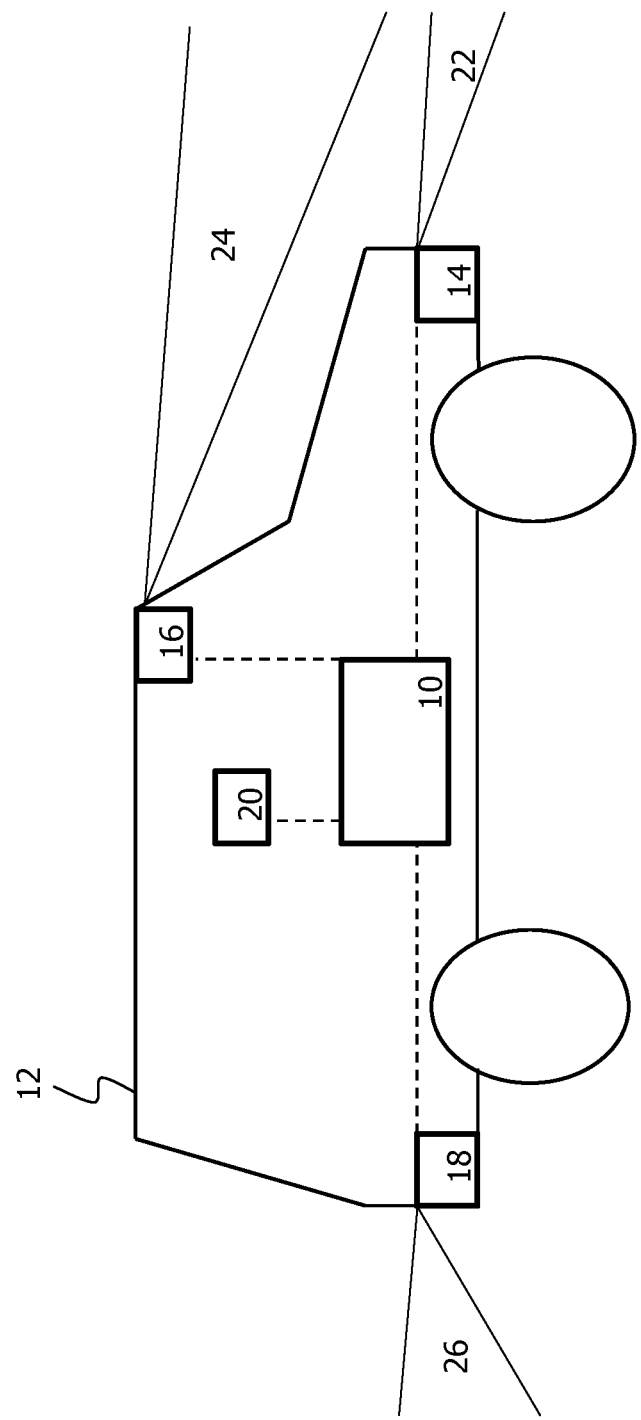
FIG. 1 shows schematically a motor vehicle according to certain exemplary embodiments, which has a control system and at least one environment sensor.

FIG. 1 shows schematically a motor vehicle 12 (the subject motor vehicle) comprising a control system 10. The control system 10 is coupled to at least one environment sensor 14, 16, 18 located on the motor vehicle 12 in order to obtain environment data from the at least one sensor 14, 16, 18. The control system 10 can include an electronic controller ECU (Electronic Control Unit; not shown in the figure). For example, the present control system 10 may be set up and designed at least to determine by means of the ECU and/or other electronic control systems a trajectory for the motor vehicle 12 and/or a trajectory for another motor vehicle which is in the vicinity of the subject motor vehicle 12 in a current driving situation of the subject motor vehicle 12. For example, the ECU receives signals from the environment sensors 14, 16, 18, processes these signals and the associated environment data and produces control and/or output signals.

FIG. 1 shows three environment sensors 14, 16, 18, which send corresponding signals to the control system 10 or the electronic controller ECU. In particular, at least one sensor 14 is arranged on the motor vehicle 12 facing forwards in the direction of travel of the motor vehicle 12, which detects a region 22 in front of the motor vehicle 12. This at least one environment sensor 14 may be arranged, for example, in the region of a front bumper, a front lamp and/or a front radiator grille of the motor vehicle 12. As a result, the environment sensor 14 detects a region 22 directly in front of the motor vehicle 12.

At least one additional or alternative environment sensor 16, also facing forwards in the direction of travel of the motor vehicle 12, is shown in the region of a windshield of the motor vehicle 12. For example, this environment sensor 16 may be arranged between an inner rearview mirror of the motor vehicle 12 and its windshield. Such an environment sensor 16 detects a region 24 in front of the motor vehicle 12, wherein, depending on the shape of the motor vehicle 12, a region 24 directly in front of the motor vehicle 12 cannot be detected due to the front section (or its geometry) of the motor vehicle 12.

Furthermore, at least one environment sensor 18 may be placed on the side and/or at the rear of the motor vehicle 12. This optional environment sensor 18 detects a region 26 which is located on the side of and/or behind the motor vehicle 12 in the direction of travel of the motor vehicle 12. For example, the data or signals of this at least one environment sensor 18 can be used to verify information collected by the other environment sensors 14, 16 and/or to determine a curvature of a lane being travelled on by the motor vehicle 12.

The at least one environment sensor 14, 16, 18 can be implemented as desired and include a front camera, a rear camera, a side camera, a radar sensor, a lidar sensor, an ultrasonic sensor and/or an inertial sensor. For example, the environment sensor 14 can be realized in the form of a front camera, a radar, lidar, or ultrasonic sensor. For the higher located environment sensor 16 a front camera is particularly suitable, while the environment sensor 18 arranged in the rear of the vehicle 12 can be implemented in the form of a rear camera, a radar sensor, a lidar sensor, or an ultrasonic sensor.

The electronic controller ECU processes the environment data obtained from the environment sensor(s) 14, 16, 18 located on the motor vehicle 12, 16, 18 in order to obtain information relating to the static environment of the motor vehicle 12 (immovable environmental objects such as road boundaries) and the dynamic environment (moving environment objects such as other motor vehicles or road users).

Thus, the electronic controller processes the environment data obtained from the environment sensor/s 14, 16, 18, located on the motor vehicle 12, in order to capture a lane being travelled on by the motor vehicle 12 with a first and a second lateral lane boundary in front of the motor vehicle 12. In addition, the electronic controller ECU processes the environment data obtained from the environment sensor/s 14, 16, 18 located on the motor vehicle 12 in order to capture a lane occupied by another object (adjacent to the lane being travelled on by the subject vehicle, wherein adjacent means that one or more other lanes may also lie between the adjacent lanes) and their lateral lane boundaries in front of, laterally adjacent to and/or behind the motor vehicle 12. The other object is another motor vehicle moving along the lane adjacent to the lane of the subject motor vehicle, or any other possible obstacle in the lane in front of that other motor vehicle.

For this purpose, the environment sensors 14, 16, 18 provide the electronic controller ECU with the environment data reflecting the region in front of, laterally adjacent to and/or behind the vehicle. For this purpose, the control system 10 is connected via at least one data channel or bus (shown dotted in FIG. 1) to the at least one environment sensor 14, 16, 18. The data channel or bus can be realized by cable or wirelessly.

Alternatively or in addition, the control system 10 or its electronic controller ECU may also obtain data from one or more other assistance systems 20 or another controller 20 of the motor vehicle 12 which indicate the traffic lanes being travelled on by the subject motor vehicle 12, the other motor vehicle and further motor vehicles with their lateral lane boundaries or this can be derived therefrom. Thus, data and information already determined by other systems can be used by the control system 10.

The control system 10 or its electronic controller ECU further determines a driving situation with the environment sensors, i.e. on the basis of the environment data obtained by means of the at least one environment sensor 14, 16, 18. Here too, an existing assistance system 20 or an electronic controller 20 can provide data and/or information defining a driving situation or from which a driving situation can be quickly derived. Depending on the determined driving situation, at least one possible trajectory is then determined, which the subject motor vehicle 12 is to follow in the further course of the journey.

The driver assistance system 20 or the electronic controller 20 can be further set up and designed to control the motor vehicle partially (autonomously). In this case, the control system 10 is set up and designed to output data to the driver assistance system 20 or the electronic controller 20 for autonomous driving. In particular, the control system 10 (or its ECU) may output data to the component 20 indicating a course of the particular trajectory which the subject motor vehicle 12 is to follow in the further course (according to the current traffic situation). The data can also be transmitted via a data channel or a bus by wire or wirelessly.

The information obtained from the environment data and provided to the control system 10 includes, for example, positions and/or speeds and/or accelerations of the subject motor vehicle 12 and/or the other motor vehicle in each lateral direction, longitudinal direction or a combination of lateral and longitudinal directions. Furthermore, this information includes, for example, relative speeds and/or relative accelerations between the subject motor vehicle 12 and the other motor vehicle in the respective directions mentioned.

Figure 2:
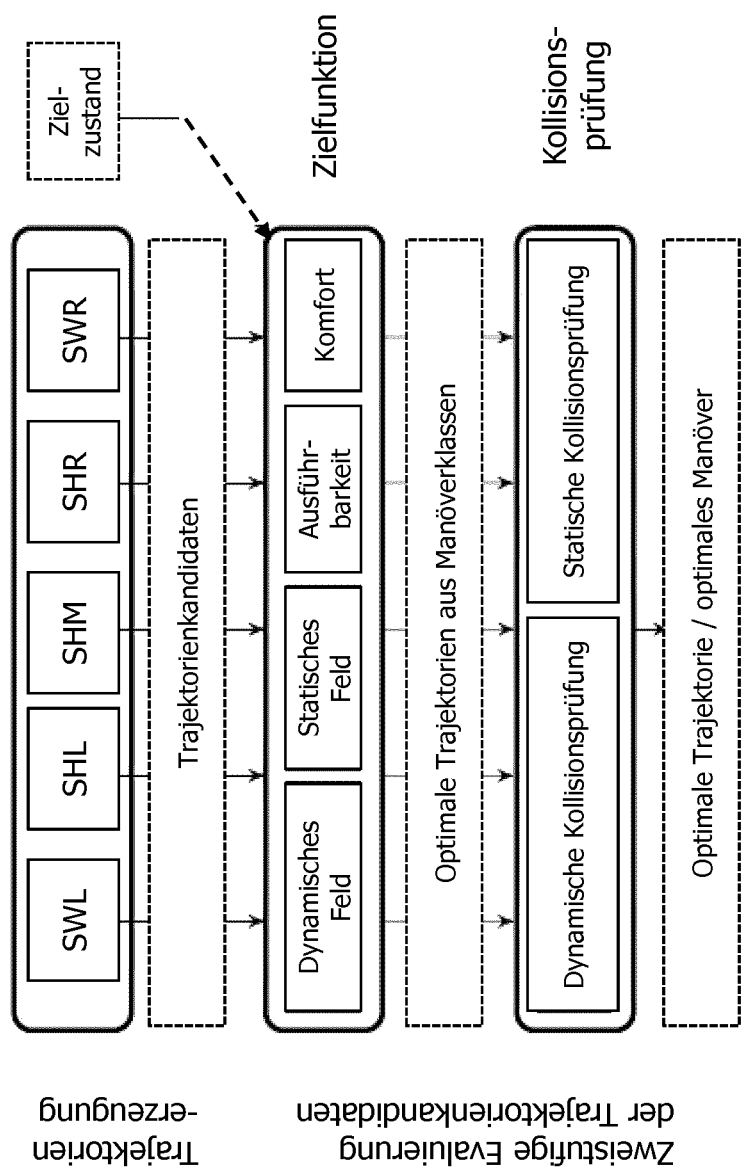
FIG. 2 shows schematically the architecture for a two-stage approach to planning and evaluating candidate trajectories according to specific exemplary embodiments.

FIG. 2 provides an overview of the approach presented here, based on real-time sampling of the environment data provided to the control system 10, in order to plan one or more trajectories for the subject motor vehicle 12 and to determine the best possible (optimum) trajectory of the planned trajectories for the further course of the journey of the subject vehicle, which is based in particular on the control system 10 and the control method presented here. From this it becomes apparent that trajectory candidates are first generated by the control system 10. These trajectory candidates are based on the lateral maneuver classes lane change to the left (SWL), lane keeping on the left (SHL), lane keeping in the center (SHM), lane keeping on the right (SHR) and lane change to the right (SWR). However, the present disclosure is not limited to this; alternatively, more or fewer or other maneuver classes can be defined.

Then the best possible trajectory candidates are selected by the control system/control method from the trajectory candidates using a target function on the basis of the maneuver classes. The target function includes target states that affect the dynamic and static environment of the subject motor vehicle 12 in the current driving situation as well as the driving comfort and implementability (feasibility) of the best possible trajectory candidates. A trajectory is not considered feasible in the context of this disclosure, for example, if the driving characteristics of the subject motor vehicle 12 cannot apply an acceleration necessary for this.

Thereafter, static and dynamic collision checks are carried out in order to determine the optimum trajectory for the subject motor vehicle 12 among the best possible trajectory candidates. The subject motor vehicle 12 then follows this optimum trajectory in the further course of the current traffic situation.

The proposed sampling strategy also allows for an independent longitudinal (running in the direction of travel) operating strategy. Desired higher-level operating properties are represented by target states. Nevertheless, the decision regarding the optimum trajectory at the level of trajectory planning is made by means of a two-level candidate selection strategy. The first level represents the target function described above, which provides the best possible trajectories from the maneuver classes. The second level is characterized by the static and dynamic collision checks.

However, before describing the sampling strategy in detail, the mathematical bases used in the trajectory planning are described below.

The control system and the control method presented in the context of this disclosure are suitable for generating example states (or sample states) for stopping points (also supporting points or nodes) $x_l$ with respect to corresponding temporal states $t_l$. In other words, at least one stopping point is assigned to each temporal state $t_l$. The determination of the stopping points thus includes at least lateral and longitudinal position values of the subject motor vehicle and/or of the other motor vehicle. In the context of the following disclosure and the figures, an Earth coordinate system, a motor vehicle coordinate system and a curvilinear coordinate system follow the notations E, F and K respectively. The Earth coordinate system and the vehicle coordinate system follow an orthogonal (for example Cartesian) framework. The corresponding letters in a superscript form before the respective values denote the corresponding coordinate system.

In order to be able to interpolate between sampled states, a spline is determined, which describes a movement of the subject motor vehicle 12 in $^F x(t)$ and $^F y(t)$, wherein the interpolator $x(t)$ is defined as follows.

$$x(t) = \begin{cases} s_l(t) & t_l \leq t \leq t_{l+1} \\ 0 & \text{otherwise} \end{cases}.$$

For $\eta-1$ spline segments and provided that $t \in \{t_l, t_{l+1}\}$ applies, the spline s is defined as follows.

$$s_l(t) = c_{v,l}(t-t_l)^v + c_{v,l}(t-t_l)^{v-1} + \ldots + c_{1,l}(t-t_l) + c_{0,l}.$$

The properties of the spline require it to pass through the stopping points $s_l(t_l) = x_l$. Another requirement is that the spline is constant between the respective spline intervals, i.e. $s_l(t_{l+1}) = s_{l+1}(t_{l+1})$ suffices.

The spline coefficients $c_0 \ldots v_{,l}$ can be determined with appropriate start and end conditions for $x_l = [^F x_l, ^F y_l]^T$ and the corresponding derivatives. The $l = 1 \ldots \eta$ supporting points of each trajectory determined in this way (underlined in the following formula) result in:

$$B = \underline{x_1, \dot{x}_1, \ldots, x_1^{(N)}, t_1, \ldots, x_\eta, \ldots, x_\eta^{(N)}, T_p}$$

For the above relationship $N = (v-1)/2$ also applies. To determine the optimum time for the transition from one spline interval to the next spline interval, time instances $t_1$ are used during sampling. The constant spline-based formulation also allows the selection of a resolution with respect to the time $\Delta T$ which is independent of the supporting points and independent of a specified forecast range $T_p$. For this reason, the trajectory points $x_k = [^F x_k, ^F y_k]^T$ are obtained by the interpolation $n = T_p/\Delta T + 1$. These trajectory points are then combined in the trajectory (which is a candidate trajectory) as follows.

$$x_{ego} = [x_1, t_1, x_2, t_2, \ldots, x_k, t_k, \ldots, x_n, T_p]^T.$$

Constant time intervals $t \in [t_k, t_{k+1}]$ for $k = 1 \ldots n$ are used for this.

The two-stage approach to trajectory planning and evaluation presented here is superior to conventional approaches, in that among other things the spline-based formulation and generation of the trajectory described above is combined with curvilinear coordinate transformation. Lateral and longitudinal positions of the determined stopping points are sampled in curvilinear coordinates and later transformed into vehicle coordinates. For example, lane boundaries and/or lane markings of a lane currently being travelled in serve as a reference for the transformation into vehicle coordinates. The transformed stopping points are connected to the spline-based interpolation described above. This results in a set of candidate trajectories, which is then evaluated in vehicle coordinates.

Figure 3:
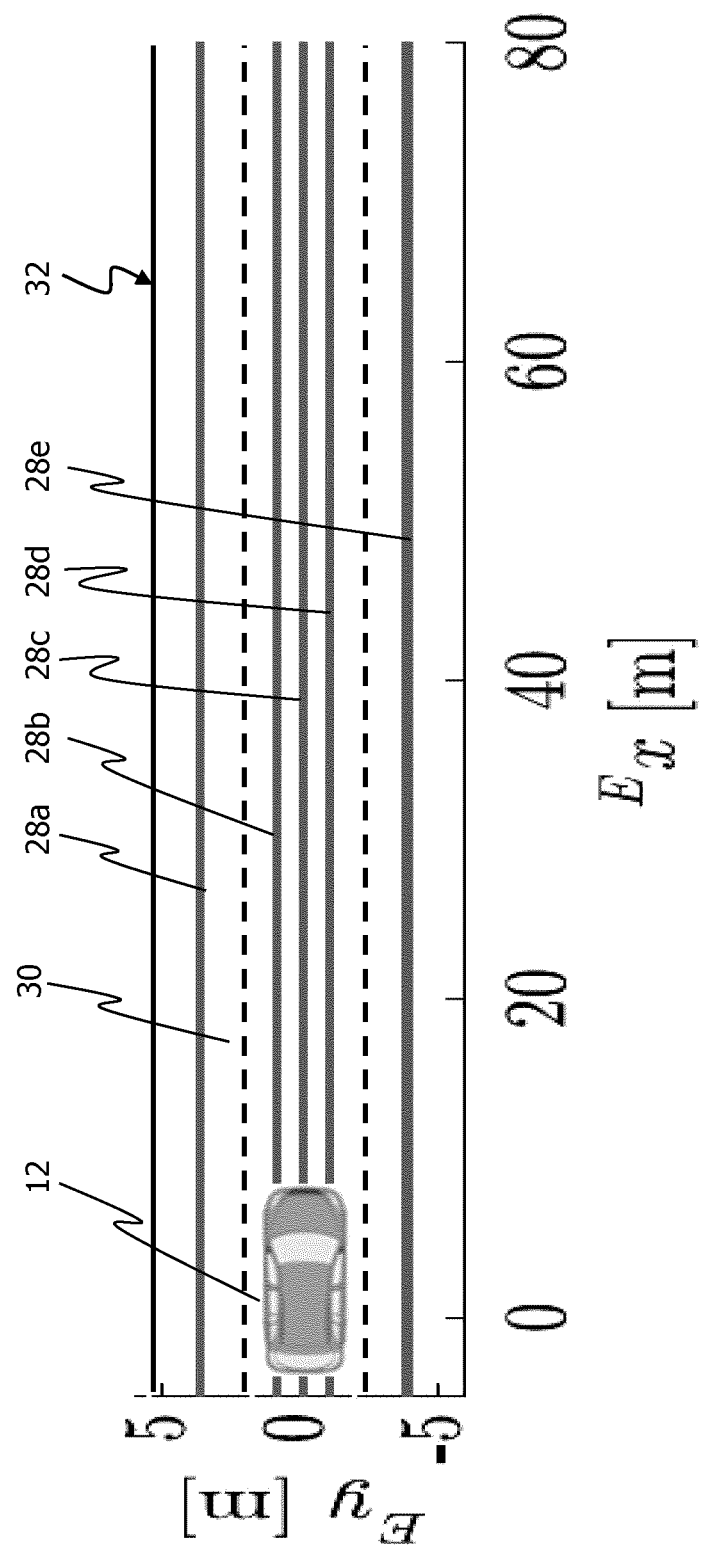
FIG. 3 shows schematic lateral reference paths (reference trajectories) for five different lateral maneuver classes according to specific exemplary embodiments.

FIG. 3 shows an exemplary driving situation of the subject motor vehicle 12. The subject motor vehicle 12 is moving in the middle lane 30 of a three-lane road (for example a highway) 32. There are no obstacles, such as other motor vehicles, on the road 32. In addition, side (lateral) reference paths (reference trajectories) 28a to 28e are shown in FIG. 3, which denote the maneuvers described at the beginning lane change on the left (reference trajectory 28a), lane keeping on the left (reference trajectory 28b), lane keeping in the center (reference trajectory 28c), lane keeping on the right (reference trajectory 28d) and lane change on the right (reference trajectory 28d).

The method of sampling the lateral position of the subject motor vehicle 12 is based primarily on the structure of the current environment of the subject motor vehicle 12. The sampled values are determined from the environment data. The set of lateral (side) maneuver classes used is based on the planning of the operating characteristics of the subject motor vehicle 12 at a higher level (for example, by the electronic controller 20 or any other suitable electronic controller of the subject motor vehicle 12). The mentioned maneuver classes lane change on the left (SWL), lane keeping on the left (SHL), lane keeping in the center (SHM), lane keeping on the right (SHR) and lane change on the right (SWR) represent selected maneuver classes, but the present disclosure is not limited to this. For example, the control system 10 (as well as the control method) can alternatively also work with three selected maneuver classes (for example lane change on the left, lane keeping and lane change on the right).

However, the larger number of maneuver classes included results in a greater variability of the maneuvers of the motor vehicle 12, in particular with regard to the lane 30 currently being travelled in (in contrast to systems that classify the maneuvers, for example, only according to SWL, SWR and lane keeping). For example, complex composite maneuvers can also be classified (for example, using SHM and SHR). Such a maneuver represents, for example, the approach of the subject motor vehicle 12 to another lane (on the left or right of the lane currently being travelled in) in order to close a gap there, for example. The use of curvilinear coordinates K noticeably simplifies the sampling of the lateral position since each of the five maneuver classes is directly associated with a specified value for $^K y_t$. In other words, the lateral sampling of the (static) vehicle environment at each sampling time provides a value which is based at least on the determined maneuver class or is assigned to this maneuver class.

Next, the sampling in the direction of travel (longitudinal sampling) is described with reference to FIG. 4. This shows a nonlinear image of a linear discretization against an adaptive discretization. Adaptive discretization is used in the longitudinal sampling, i.e. the determination of longitudinal positions (or position values) and/or speeds (or speed values) of the subject motor vehicle 12 and/or the other motor vehicle.

Due to the limited computing resources in partially (autonomous) motor vehicles, it is necessary to produce a finite yet meaningful set of possible trajectories (trajectory candidates). For this reason, in the context of the present disclosure, in addition to the state-based sampling strategy for lateral sampling, an action-based sampling strategy is used to sample longitudinal parameters such as the position $^K x_t$ and/or the speed $^K v_t$. The longitudinal acceleration (in the direction of travel of the motor vehicle) $^K \alpha_x(t)$ of the subject motor vehicle and/or of the other motor vehicle is used as a control parameter. A second-order model is used to generate longitudinal samples for the position $^K x_t$ and the speed $^K v_t$ relative to the curvilinear coordinate system K (again superscripted before the respective value in the following relationship) according to the following relationship.

$$\begin{bmatrix} \dot{K}_{x(t)} \\ \dot{K}_{v(t)} \end{bmatrix} = \begin{bmatrix} 0 & 1 \\ 0 & 0 \end{bmatrix} \begin{bmatrix} K_{x(t)} \\ K_{v(t)} \end{bmatrix} + \begin{bmatrix} 0 \\ 1 \end{bmatrix} K_{a_x(t)}.$$

A finite set of control inputs $^K \alpha_x \in \mu$ is then determined for the adaptive discretization. Assuming that the best possible control input for a currently to be performed planning step (planning cycle) of the trajectory planning is close in time to that of the last planning step, a higher resolution is required in the region of the actual longitudinal acceleration. Nevertheless, minimum and maximum acceleration values must be taken into account.

Figure 4:
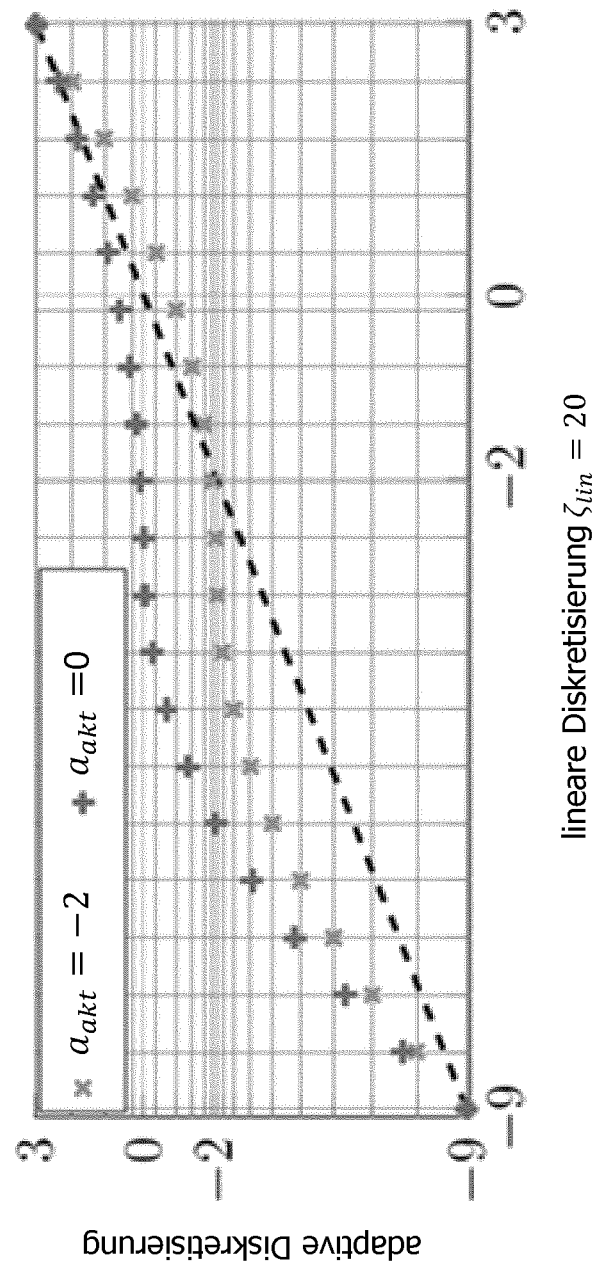
FIG. 4 shows schematically a nonlinear representation of linear to adaptive discretization using different exemplary acceleration values as control parameters according to specific exemplary embodiments.

In the adaptive (situation-adapted) discretization strategy derived from this, as shown in FIG. 4, two parabolas $f_1$ and $f_2$ are therefore used to transform the linearly sampled values z (which are determined from the environment data) online (i.e. in real time or essentially in real time) and depending on the actual acceleration value $z_{akt}$ of the subject motor vehicle 12 and/or of the other motor vehicle. The coefficients required for this are determined from the following conditions:

$$f_1(z_{min}) = z_{min} f_1(\bar{z}) = z_{akt} f'_1(\bar{z}) = 0$$

$$f_2(z_{max}) = z_{max} f_2(\bar{z}) = z_{akt} f'_2(\bar{z}) = 0,$$

where $\bar{z}$ is defined as $\bar{z} = (z_{max} - z_{min})/2$. The adaptive (adapted) sampled value $f(z)$ is then determined as follows.

$$f(z) = \begin{cases} f_1(z) & z < (z_{max} - \bar{z}) \\ f_2(z) & z \geq (z_{max} - \bar{z}) \end{cases}.$$

The result of the adaptive discretization for current acceleration values of the subject motor vehicle 12 and/or the other vehicle $\alpha_{akt} = -2$ and $\alpha_{akt} = 0$ (for the respective valid sampling situation) is shown in FIG. 4. The closely adjacent horizontal grid lines of the figure show the desired higher resolution in the region of the current value for the adaptive discretization with respect to $\alpha_{akt} = -2$.

The advantage of the adaptive discretization is evident when evaluating an approach from the rear scenario on a highway and/or expressway. This scenario contains varying longitudinal accelerations needed to successfully cope with dynamic day-to-day traffic. For comparison, a linearly discretized reference trajectory with quasicontinuous values is shown in FIG. 4, against which the adaptive discretization 4 is plotted. This approximates to the best possible solution with respect to the target function.

Figure 5:
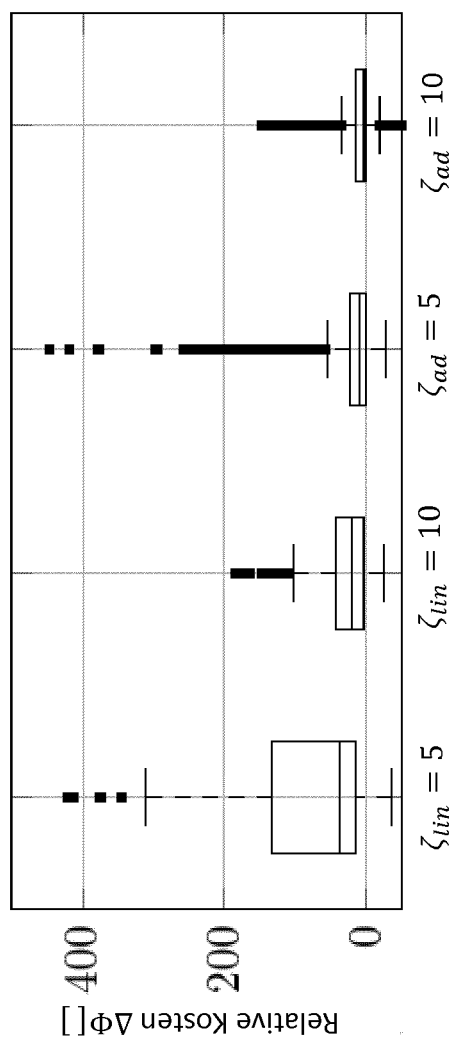
FIG. 5 shows schematically an illustration of the relative cost of adaptive discretization compared to linear discretization for a different number of longitudinal accelerations according to specific exemplary embodiments.

The relative costs $\Delta\Phi$ are calculated from the difference of the open-loop results between a reference solution $\Phi_{opt}$ and the suboptimal (next best possible) solution $\Phi$ of the approach with the corresponding longitudinal sampling strategy. Four variants were tested, each of which is used to compare linear and adaptive discretization in terms of the number of sampled longitudinal accelerations $\zeta = 5$ and $\zeta = 10$. The results are shown in FIG. 5. This shows the advantage of adaptive sampling due to the lower relative cost compared to linear sampling.

Comparing the adaptive sampling strategies with each other (the right two parts of FIG. 5 $\zeta_{ad} = 5$ and $\zeta_{ad} = 10$), the occurrence of a reduced number of outliers for $\zeta_{ad} = 10$ can be explained by using for the discretization in the current planning step the last best possible acceleration value determined (in the last planning step before the current planning step).

It should be noted that even the reference solution for the cost function $\Phi_{opt}$ is merely an approximation of the best possible (optimum) solution to enable relative costs of less than zero. The changes in the dynamic environment are slower (i.e. take a relatively longer time) than the calculation time for a planning cycle, so that the control system or the control method adapts easily, and the suboptimal acceleration is found depending on the current traffic situation.

The two-stage planning and evaluation approach as part of the control system 10 is designed for simultaneous planning of longitudinal and lateral movements, since the trajectory to be planned for the subject motor vehicle 12 should follow any curve and at the same time the traffic situation directly in front of, laterally adjacent to and behind the subject motor vehicle 12 must be taken into account. Therefore, lateral and longitudinal sampling states are transformed and combined to produce the trajectory candidates.

The transformation strategy used in this case is described below with reference to FIG. 6. In order to transform the curvilinear coordinates into vehicle coordinates, a reference lane marking recognized by the environment sensors (see, for example, the road marking 32 in FIG. 3) is selected by the control system 10 or its electronic controller. The reference lane marking 32 is defined as a cubic polynomial $f_{ref}$. To calculate the arc length, the finite integral is approximated, and the trapezoidal rule is applied. In this way, a look-up table for equally spaced queries is generated within the region of the detected lane marking $^F x_i \in [x_s, x_e]$. This results in a mapping of $^K x$ on the initial solution of the transformation $Fx_0$. The initial value (starting value) for the lateral part is given by $^F y_0 = (f^F x_0)$. With the orthogonal slope $m\perp = -1/f'_{ref}(^F x)$, the transformed position in the x-direction and y-direction of the vehicle coordinates results:

$$^F x = ^F x_0 + ^K t * 1/\sqrt{1+m_\perp^2}$$

$$^F y = ^F y_0 + ^K y * m_\perp/\sqrt{1+m_\perp^2}$$

Figure 6:
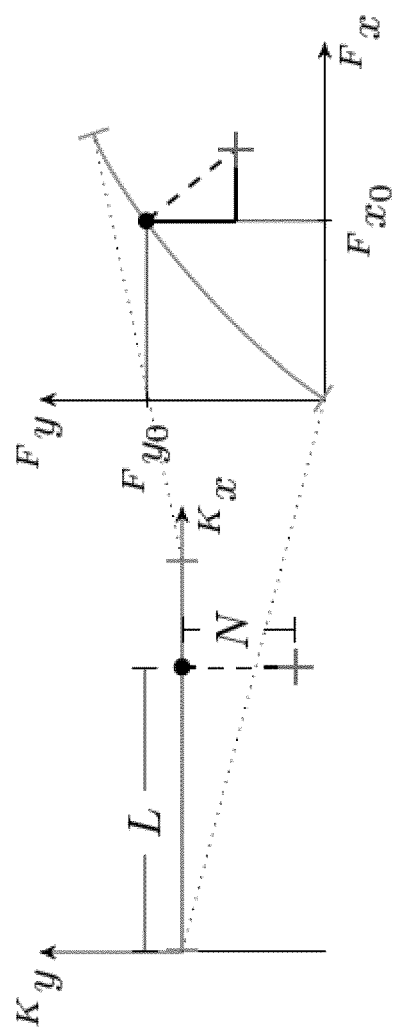
FIG. 6 shows schematically the transformation from curvilinear coordinates K to vehicle coordinates F according to specific exemplary embodiments.

FIG. 6 thus illustrates how a transformation from the curvilinear coordinate system K to the vehicle coordinates F takes place. The evaluation of the look-up table for $^K x=L$ returns the position $^F x_0$ (the position in the x-direction in curvilinear coordinates). The arc length is then calculated by numerical integration of the reference polynomial. This determines the position $^F y_0$ (the position in the y-direction in curvilinear coordinates). Taking into account the normal distance $^K y=N$, the desired coordinates in the vehicle coordinate system F result from trigonometric considerations.

Figure 7:
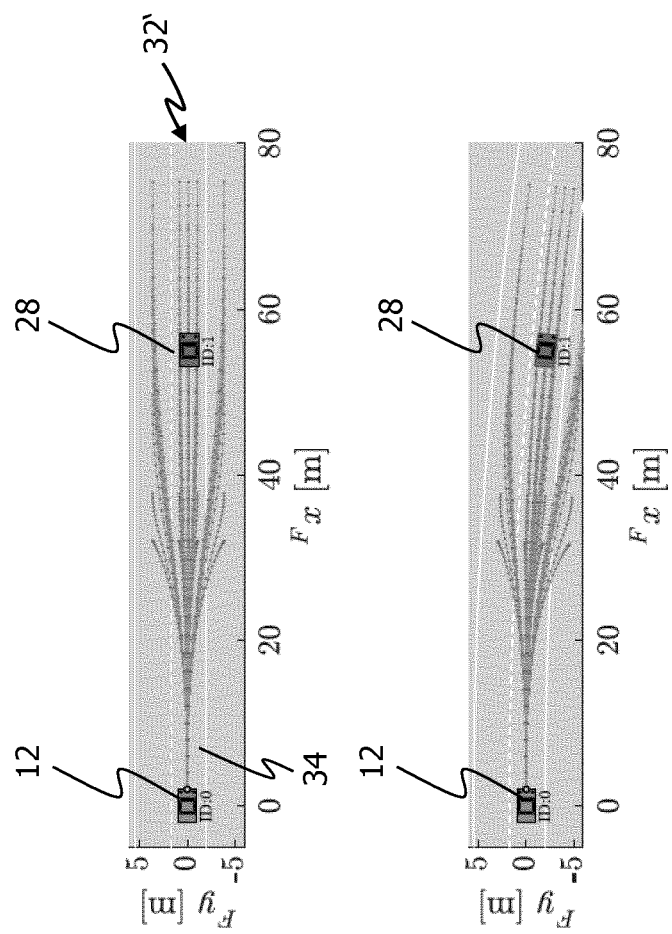
FIG. 7 shows schematically a set of determined candidate trajectories according to specific exemplary embodiments for a straight road section (upper picture) and a winding road section (lower picture).

After the positions have been transformed into vehicle coordinates, stopping points (also supporting points or nodes) are determined by so-called subsampling and a set of trajectory candidates is calculated using the spline interpolation described above. Such a resulting set of trajectory candidates $C$ (reference character 36) is shown in FIG. 7 in the context of an exemplary traffic scenario (also a driving situation or traffic situation). In each case, the subject motor vehicle 12 is to be seen, as it follows another motor vehicle 28 in the right lane 34 of a two-lane lane road 32'. The upper image of FIG. 7 shows a scenario with the other motor vehicle 28 as a (static or dynamic) obstacle for a straight section of road. In the lower image of FIG. 7 a corresponding scenario for a winding section of the road is described.

In other words, FIG. 7 shows a plurality (also a set) of combined candidate trajectories 36, i.e. composed of or determined from lateral and longitudinal samples (positions and/or speeds) for the subject motor vehicle 12. The individual trajectories, which make up the set of candidate trajectories 36, are each represented as gray lines and are connected by the stopping points indicated on the lines in point form.

An important aspect of sampling-based trajectory planning is the exact and rapid determination of candidate trajectories 36. Therefore, the two-stage planning and evaluation approach mentioned above is used in the context of this disclosure. Thus the aspects of comfortable driving for people and exact collision avoidance are combined. This is against the background that the candidate trajectories 36 (and above all the optimum trajectory for the current traffic situation of the subject motor vehicle 12 determined from the candidate trajectories at the end) should reflect human driving behavior on the one hand, but on the other hand safe and precise maneuvering must be ensured. For this reason, the candidate trajectories 36 of each maneuver class are evaluated (checked) by a comprehensive target function, which models physically inspired safety distances for dynamic collision avoidance, and also takes into account the static collision avoidance, the feasibility (executability) and comfort targets for the respective current traffic situation of the subject motor vehicle 12. Thus, the optimum (best possible) trajectory is chosen for each current driving situation and for each maneuver class.

For safety reasons, a recheck is carried out for each selected optimum trajectory with an exact geometric representation of the vehicles involved. If the recheck fails, a switch can be made to a replacement strategy which is not described in detail here.

In order to determine the (globally) optimum trajectory from the trajectory candidates 36, the best possible trajectories of the individual maneuver classes are compared with each other. This comparison is made by means of the described cost function $\Phi$, which is why the optimum trajectory represents the best maneuver class for the current driving situation of the subject motor vehicle 12 at the same time. The following formula represents the comparison for determining the optimum trajectory $x^*_{ego}$:

$$x^*_{ego} = \arg\min_{x_{ego} \in C}(\omega_d b_d + \omega_s b_s + \Phi).$$

Here $\Phi$ denotes the costs of the target function. The expressions $b_d$ and $b_s$ are defined as follows:

$$b_d = \begin{cases} 1 & \text{for a dynamic collision} \\ 0 & \text{otherwise} \end{cases}.$$

$$b_s = \begin{cases} 1 & \text{for a static collision} \\ 0 & \text{otherwise} \end{cases}.$$

Figure 8:
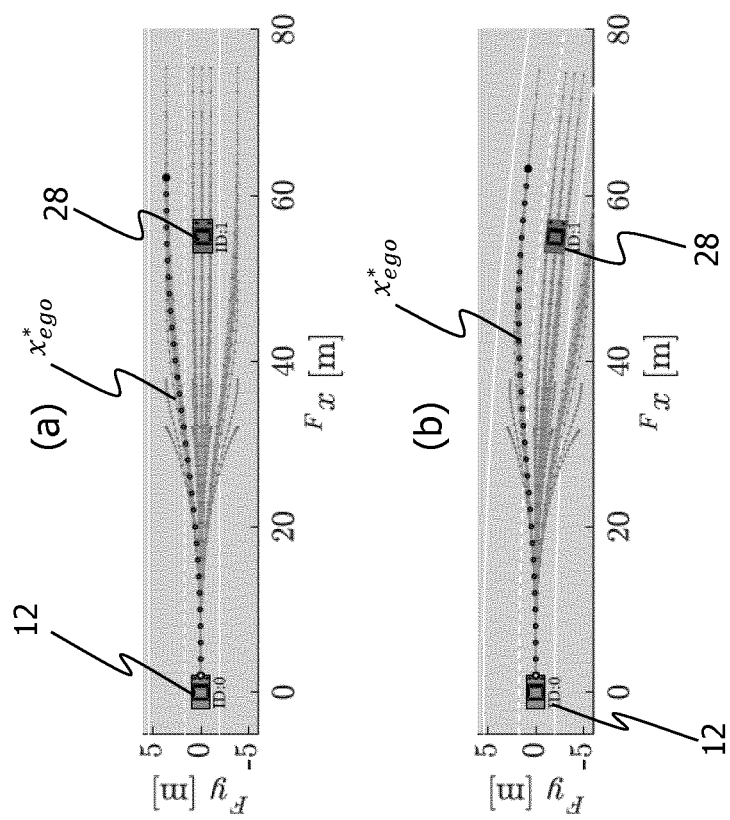
FIG. 8 shows schematically a best possible (optimum) trajectory determined by the control system from the set of determined candidate trajectories according to specific exemplary embodiments for a straight road section (upper picture) and a winding road section (lower picture).

In addition, the expressions $\omega_d$ and $\omega_s$ represent weighting parameters for exact collision control. FIG. 8 shows results of the calculation of the globally optimum trajectory $x^*_{ego}$ among the trajectory candidates 36 for the road sections or driving situations already presented with reference to FIG. 7. The optimum trajectory $x^*_{ego}$ is illustrated with thicker and darker points compared to the other trajectories of the trajectory candidates 36.

Next, the calculation of the target function is described, which is defined as a comprehensive target function for the evaluation (determination) of the best possible trajectory $x^*_{ego}$ for the subject motor vehicle 12. Therefore, individual terms of the target function take into account the dynamic collision avoidance by means of a dynamic field (environment), the static collision avoidance by means of a static field (environment), the feasibility/executability of the best possible trajectory and the driving comfort of the subject motor vehicle 12 when following the optimum trajectory $x^*_{ego}$. Both in the upper image of FIG. 8, where the optimum trajectory $x^*_{ego}$ is evaluated for a straight section of road, and in the lower image of FIG. 8, where the best possible trajectory $x^*_{ego}$ is evaluated for a winding section of the road, if the evaluation leads to a lane change maneuver to the left, so that if it follows this determined optimum trajectory $x^*_{ego}$ in the further course of the current traffic situation, the subject motor vehicle 12 can overtake the other motor vehicle 28, for example because it is travelling slower than the subject motor vehicle 12 and/or has to perform a deceleration process, which forces the subject motor vehicle 12 into an evasion maneuver.

The cost function that is included in the target function is defined as follows:

$$\Phi = e^T \Omega e.$$

Here $\Omega$ represents a weighting matrix $\Omega \in \mathbb{R}^{d_{err} \times d_{err}}$. The expression e denotes an error vector, which is determined as follows:

$$e = [o_1, o_2, \ldots, o_z, \chi(h_1), X(h_2), \ldots, \chi(h_{n-1})]^T$$

The expressions $o_i$ each represent the targets of the target function. Inequality conditions are taken into account by $\chi(h_k) = \max\{[0, h_k]\}$. In this way, the conditions imposed on the current driving situation of the subject motor vehicle 12 by the static and dynamic environments are taken into account. In addition, conditions relating to the vehicle dynamics of the subject motor vehicle 12 such as its maximum acceleration (which may be defined, for example, by the Kamm circle) and not holonomic vehicle characteristics are recorded. The deviation from the desired target state is also formulated as the target of the target function. This target state is defined by a higher-level planning module and is not described here in more detail. In order to meet the targets ($o_i$) related to driving comfort, the sideways (lateral)

acceleration and the acceleration in the direction of travel (longitudinal) as well as the jolt (the derivate of acceleration against time) in the lateral and longitudinal directions of the subject motor vehicle 12 are minimized when following the optimum trajectory $x^*_{ego}$.

Next, the basics of collision checking used here are described with reference to FIG. 9. In order to ensure collision avoidance for candidate trajectories 36 for the subject motor vehicle 12, an exact geometric model of the subject motor vehicle 12 and the other motor vehicle 28 (i.e. in the general case of models of potentially colliding motor vehicles) is important. In the context of this disclosure, bounding boxes are used to represent the shape of the subject motor vehicle 12 and the other motor vehicle 28 and/or further motor vehicles involved in the current traffic situation. This can be seen, for example, from FIG. 9. The rectangular boxes are particularly suitable for depicting convex shapes, which are often used in car bodies, with high accuracy.

In the context of the dynamic collision check, high accuracy of the model also leads to a higher computational effort for the control system executing the collision check (in this case the control system 10). To prevent this, for example, a hierarchical pruning of possible collisions can be performed, but this in turn results in a reduction in the number of exact collision checks. In contrast, multiple interference tests require the examination of each individual candidate trajectory point by point against all obstacle trajectories, i.e. trajectories which the subject motor vehicle 12 determines for example for the other motor vehicle 28 on the basis of its current driving behavior and the current driving situation of the subject motor vehicle 12 and/or the other motor vehicle 28. This point-by-point check corresponds to the worst case scenario with regard to the computing resources of the executing control system, the calculation of which must always be taken into account in executable time due to safety considerations. In order to adequately evaluate the dynamic environment, the collision check is carried out in space and time. The separation theorem (the Eidelheit theorem) is used to represent temporal overlaps between two rectangles.

Figure 9:
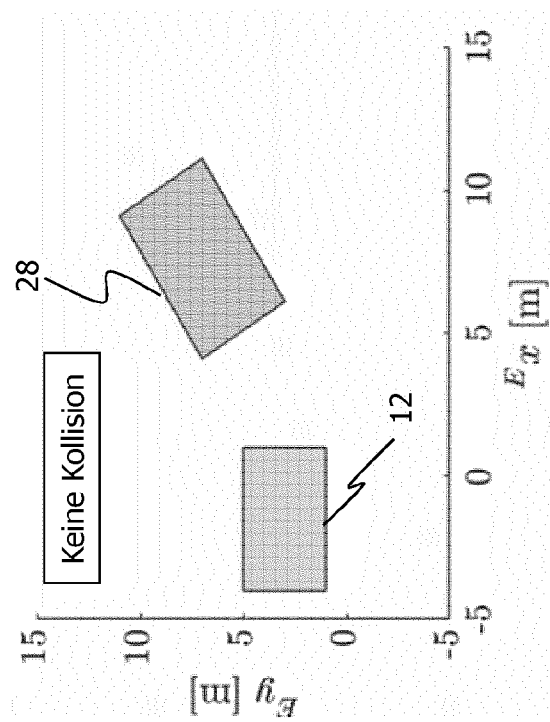
FIG. 9 shows schematically the separation theorem applied according to specific exemplary embodiments.
Figure 9:
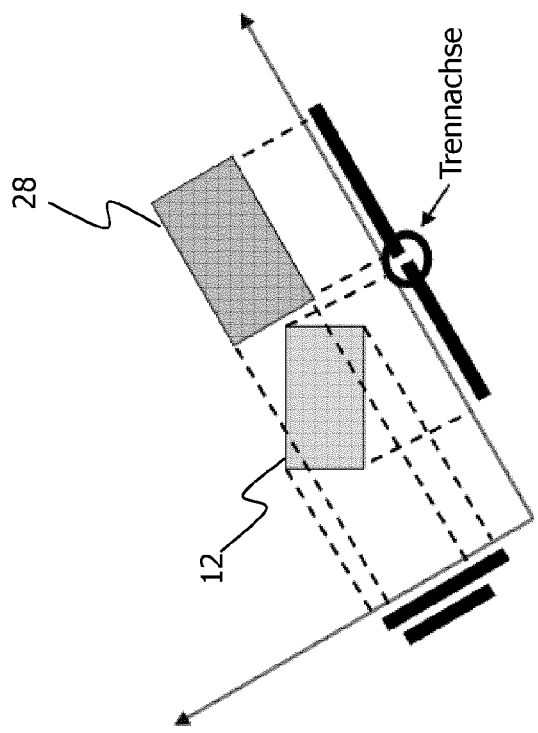

FIG. 9 illustrates the separation theorem. It can be seen that the subject motor vehicle 12 does not collide with the other motor vehicle 28 (both are shown as rectangles) if there is a line on which both rectangles (i.e. objects) can be projected and the objects on this line do not overlap. This is the case in the example shown in FIG. 9. In the context of the dynamic collision check, all trajectory candidates 36 of the subject motor vehicle 12 are checked for overlaps for each time $t_k$ with trajectory data for the other motor vehicle 28 determined by the subject motor vehicle 12.

Figure 10:
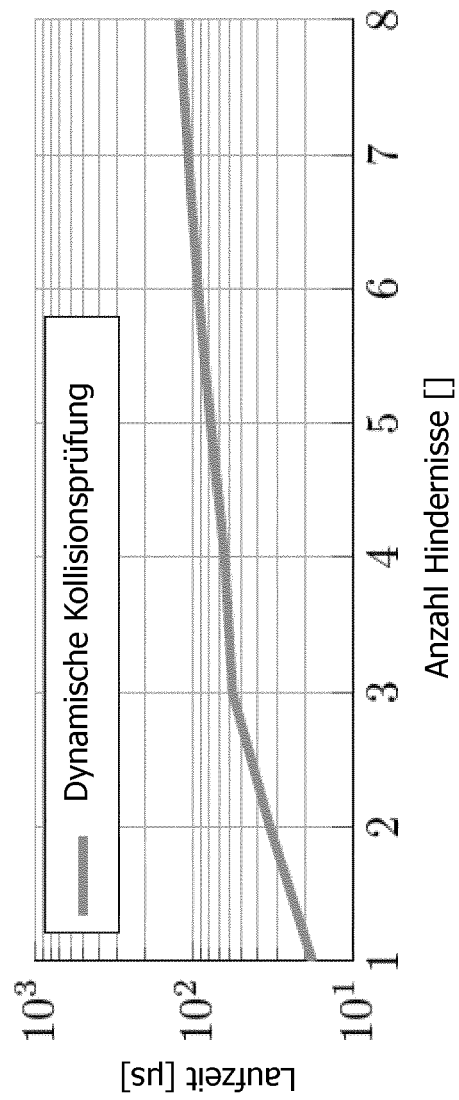
FIG. 10 shows schematically the mean runtime for dynamic collision checking according to specific exemplary embodiments.

The runtime of the dynamic collision check is shown in FIG. 10. In the present exemplary embodiment, an average runtime for the exact dynamic collision check using bounding boxes is assumed, which was determined for 10000 check runs with trajectories consisting of 31 trajectory points. It is clear that the average runtime depends on the number of obstacles (for example other motor vehicles) in the vicinity of the subject motor vehicle. Even for a larger number of obstacles (for example, seven), the average duration is about 100 μs.

Figure 11:
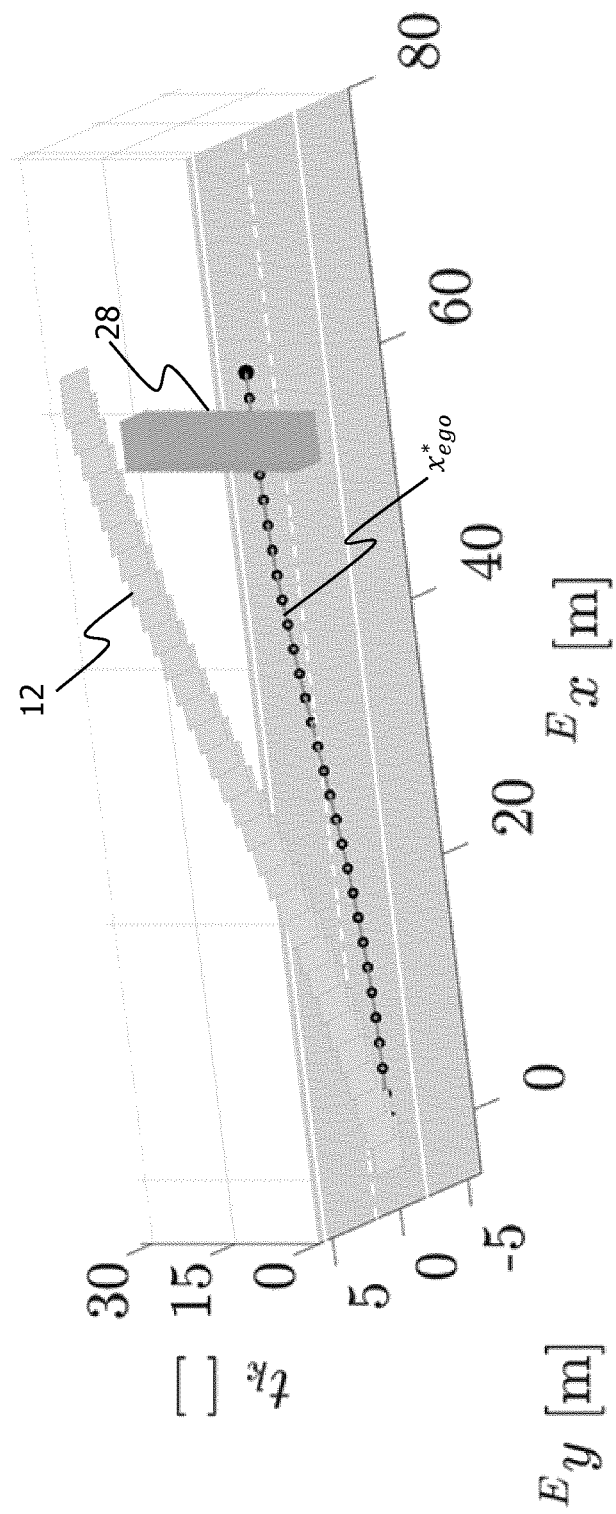
FIG. 11 shows a schematic representation for dynamic collision checking using the separation theorem according to specific exemplary embodiments.

FIG. 11 shows an example of exact dynamic collision checking in the space-time domain using the separation theorem. The subject motor vehicle 12 and the other motor vehicle 28 are modelled as rectangles. Each individual rectangle 12 illustrated (the rectangles in FIG. 11, whose position changes in the x-direction over time) represents a position of the subject motor vehicle 12 in the space-time domain. The stacked rectangles 28 each represent a position of the other motor vehicle 28 in the space-time domain. The optimum trajectory $x^*_{ego}$ is checked for overlaps at each time $t_k$ against one or more trajectories determined for the other motor vehicle 28 (the control system 10 of the subject motor vehicle 12 is set up and designed for this purpose). A detected overlap indicates a possible collision.

A static collision check is also carried out to detect, for example, an imminent collision of the subject motor vehicle 12 with a road boundary. This is achieved by calculating the smallest distance between the bounding box of the subject motor vehicle 12 and that of the corresponding lane marking.

Figure 12:
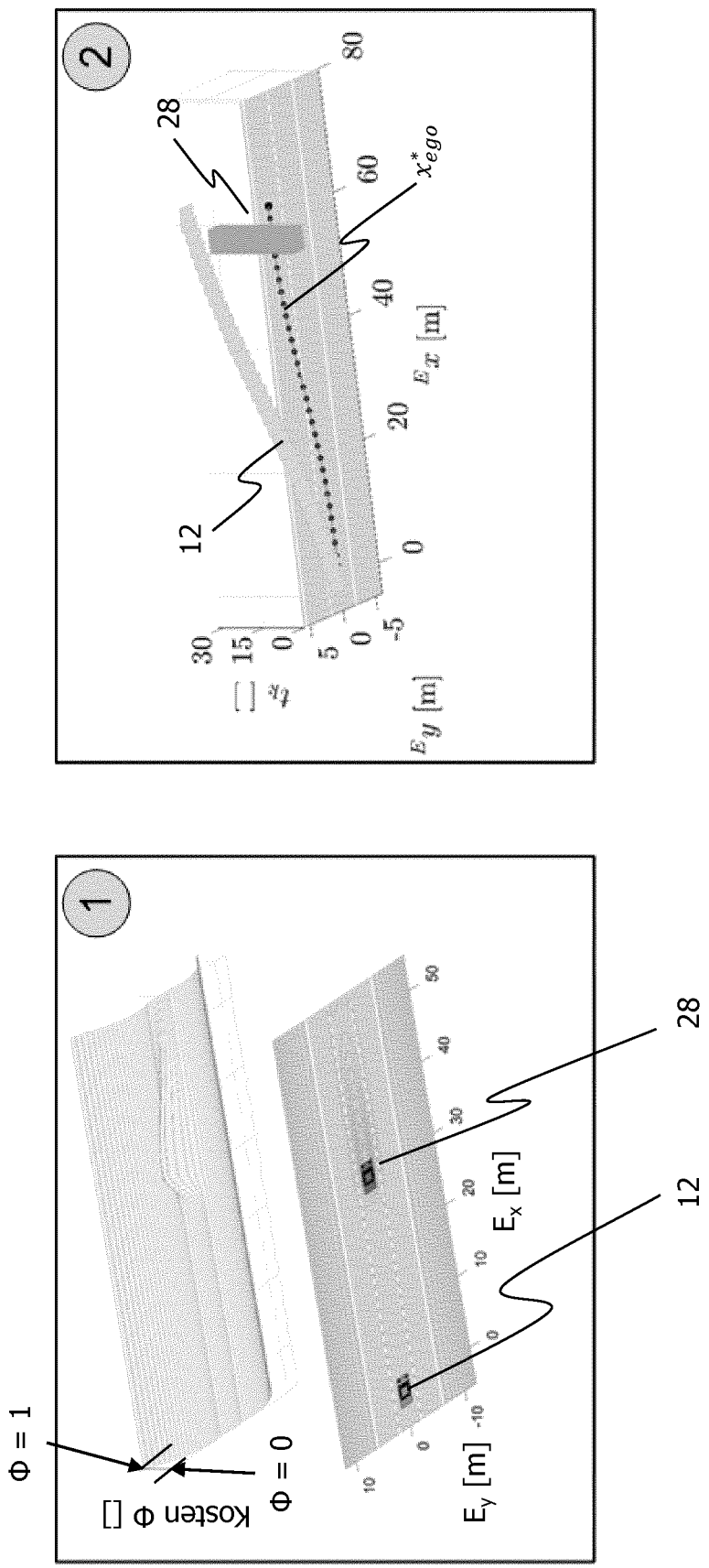
FIG. 12 shows a schematic representation of the two-stage trajectory planning and evaluation approach according to specific exemplary embodiments with the first stage of sampling-based determination of the candidate trajectories (left) and the second stage of the collision check (right).

The two-stage or two-level trajectory planning and evaluation approach and its two planning stages are shown again in FIG. 12 for clarity. The left image, marked with a one in a circle, shows the first planning phase. There, the trajectory candidates 36 are determined from the target function (see also FIG. 2 and the corresponding description). The second planning step concerns the collision check described above (static and dynamic) and is shown on the right side of FIG. 12.

Figure 13:
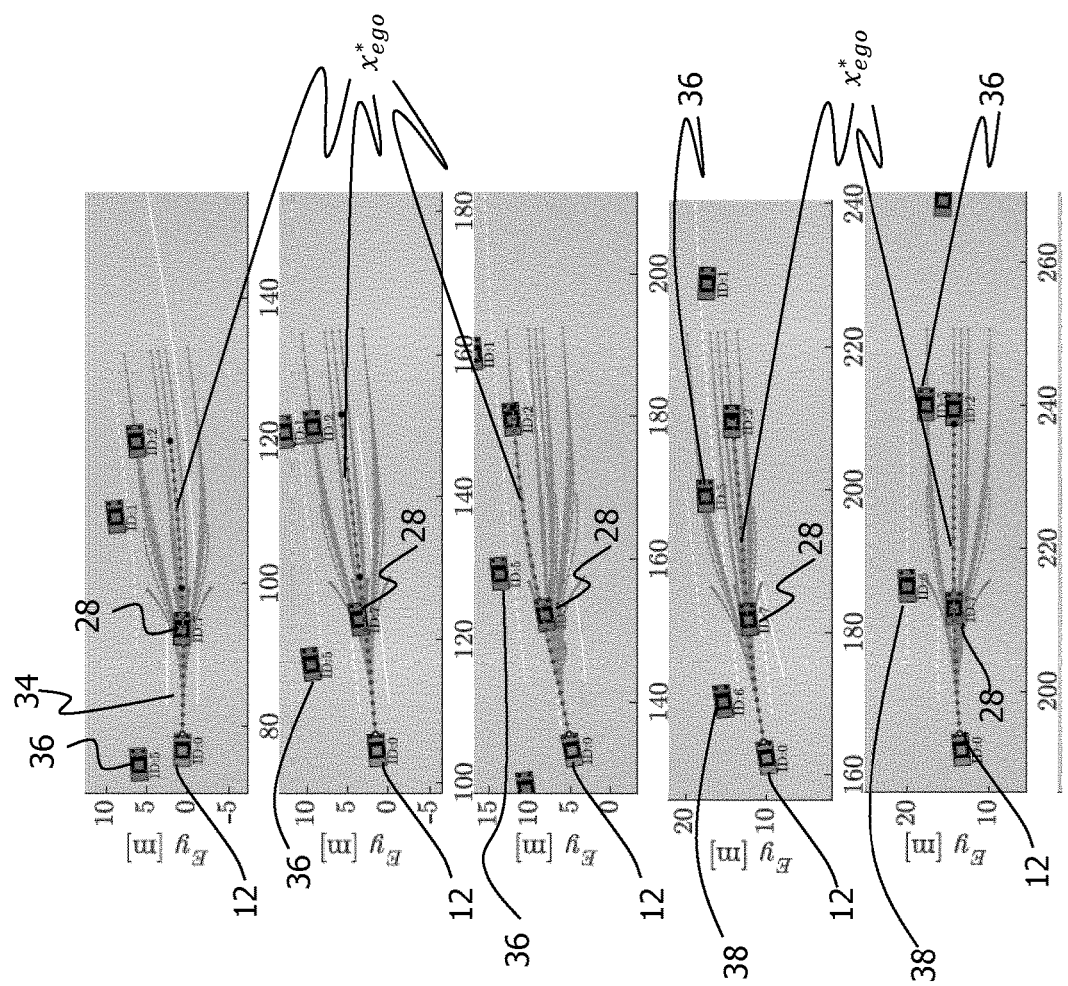
FIG. 13 shows schematically (from top to bottom) the first five representations of an approach from the rear scenario on a highway according to specific exemplary embodiments using the two-stage trajectory planning and evaluation approach.
Figure 14:
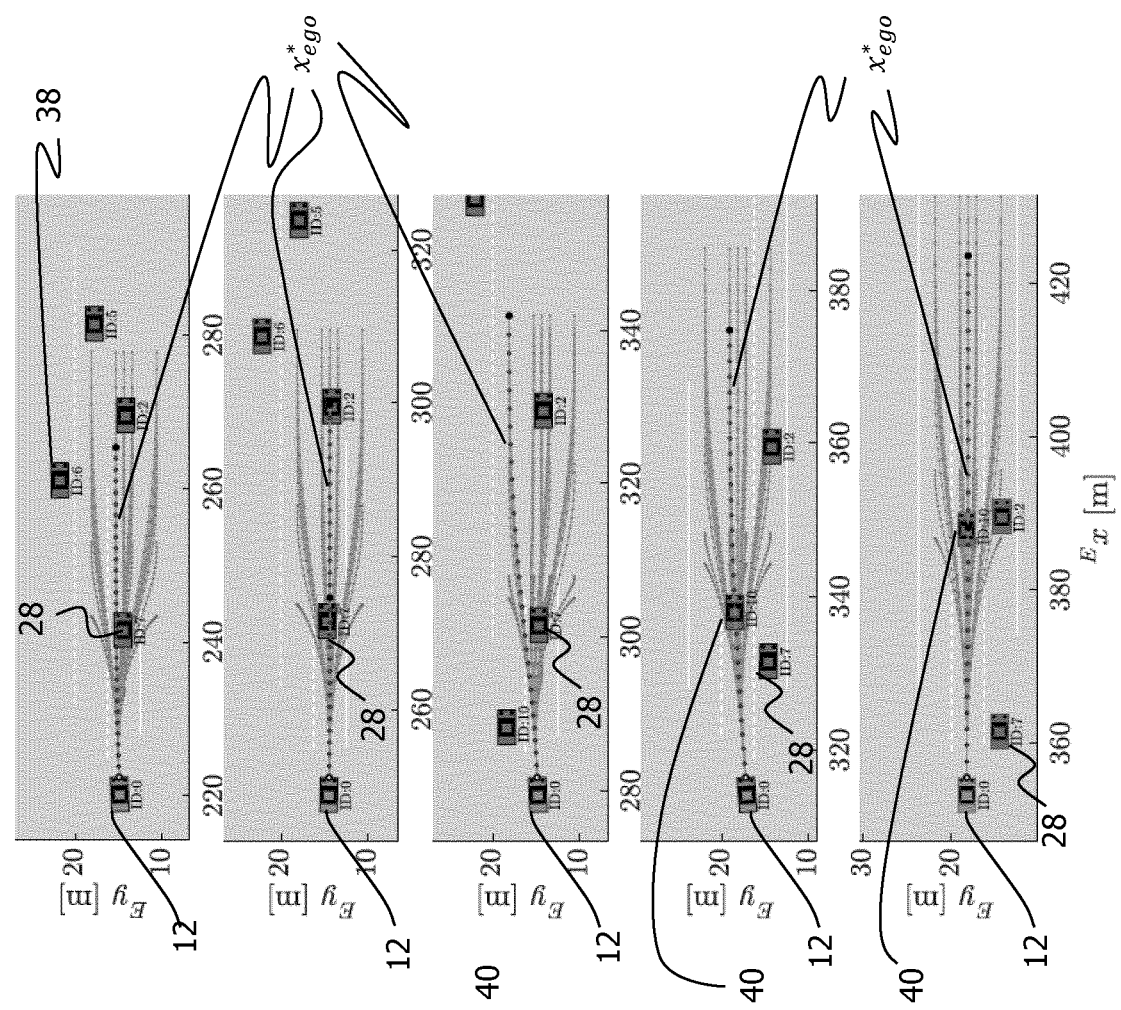
FIG. 14 shows schematically (from top to bottom) the second five representations of the approach from the rear scenario on a highway according to specific exemplary embodiments using the two-stage trajectory planning and evaluation approach.

With reference to FIGS. 13 and 14, the functions of the control system 10 or the two-stage trajectory planning and evaluation approach are now illustrated by means of a realistic traffic scenario. FIGS. 13 and 14 each consist of five images, which can be viewed in order from top to bottom. The traffic scenario is the approach to a highway, with several other motor vehicles in the region of the approach section (all motor vehicles which are not referenced with the number 12 in FIGS. 13 and 14), such as the other motor vehicle 28. There are 2 seconds between each of the five images in FIGS. 10 and 11.

The subject motor vehicle 12 shown in FIGS. 13 and 14 is equipped for the specific described example with radar sensors on its front, rear and sides and additionally has a camera, which monitors the region in front of the subject motor vehicle 12. Thus static and dynamic environment information is obtained from the environment data provided to the control system 10 in the manner described. The reference lane for the transformation of curvilinear coordinates K into orthogonal vehicle coordinates F is selected in the current driving situation by the control system 10 of the subject motor vehicle 12 based on the camera data. In the current driving situation or sampling situation, the lane marking from which the camera of the subject motor vehicle 12 can detect the largest area compared to other existing lane markings is selected as the reference lane marking. By further including map data, which are provided to the control system 10, for example by a navigation system available in the subject motor vehicle 12 or in any other appropriate way wirelessly or wired, the accuracy and thus the quality of the results are increased.

The control system 10 works, for example, with model-predictive control (receding horizon control), since the environment data used for trajectory planning and collision avoidance are updated cyclically.

For the example, which is to be considered here as non-restrictive for the functionality of the control system 10, an average runtime of 40 ms is used for a set of one hundred trajectories for a single core processor with a clock rate of 3.30 GHz and 6 MB cache. An order of v=5 is set for the spline-based interpolation for generating the candidate trajectories 36, and three seconds are selected for the predictive scope $T_P$.

Trajectories for the basic lane keeping center (SM) maneuver are modeled as a spline with η=3 supporting points with an intermediate time $t_{i=2}$=1.5 s. For the trajectories of the other maneuver classes, the number of supporting points is η=2.

In the context of the maneuver on the highway shown in FIGS. 13 and 14, the vehicle marked with ID:7 in the figure is first selected by the control system 10 as the other motor vehicle 28. This selection is based on the relevance of all other motor vehicles for the current driving situation of the subject motor vehicle 12, which is determined by the control system 10. The subject motor vehicle 12 is following the other motor vehicle 28 in the situation shown (first picture from the top in FIG. 13) on the same lane 34 and currently has a higher driving speed than the other motor vehicle 28. Lane 34 is a winding access lane onto the highway. Thereafter, the subject motor vehicle 12 and the other motor vehicle 28 change from lane 34 to the right lane of the highway.

At this time, the driver or the driver assistance system 20 of the subject motor vehicle 12 wants to increase the longitudinal speed of the subject motor vehicle 12 to 90 km/h. An overtaking process carried out by the subject motor vehicle 12 is not possible at the beginning of the driving scenario, even if the other motor vehicle 28 is currently driving slower, for example at 70 km/h. Trajectories that cause a change of lane to the left would most probably lead to collisions with the other motor vehicle 36, which is in turn overtaking. In the later course (with the beginning of the fourth picture from the top of FIG. 13) an overtaking maneuver of the subject motor vehicle 12 is prevented by the further motor vehicle 38. Therefore, the control system 10 will select a trajectory for lane keeping (SHM) and the subject motor vehicle 12 will be slowed down, for example caused by the driver assistance system 20, in order to maintain a constant distance from the other motor vehicle 28 in front (see FIGS. 2 to 5 from the top in FIG. 13).

In the top image of FIG. 14 it can be seen that the control system 10 is considering an overtaking process for the current situation.

The control system 10 thus selects as the optimum trajectory $x^*_{ego}$ a trajectory for lane keeping on the left (SHL, cf. also the reference path 28b in FIG. 3) from the trajectory candidates 36. The subject motor vehicle 12 thus performs a driving maneuver in which it approaches the lane to the left of its current lane in order to initiate the overtaking process.

In the second picture from the top of FIG. 14 it can be seen that again a trajectory for lane-keeping in the center is selected by the control system 12 from the trajectory candidates 36. The overtaking maneuver was therefore aborted (for example by the control system 10 and/or by the driver assistance system 20) and the subject motor vehicle 12 is again essentially in the middle of the lane in which it is currently travelling.

The reason for this can be seen in the middle image of FIG. 14. A motor vehicle 40 travelling at a higher speed than the subject motor vehicle 12 approaches the subject motor vehicle 12 from behind in the overtaking lane. There is again a risk of a collision, which is why a maneuver to overtake the subject motor vehicle 12 is not possible.

In the fourth image from the top in FIG. 14 it can be seen that the faster-moving motor vehicle 40 has meanwhile established a relatively large distance from the subject motor vehicle 12 in the longitudinal direction ($E_x$ in FIGS. 13 and 14), so that an overtaking maneuver of the subject motor vehicle 12 is now possible. Even in the fast lane, no faster-moving vehicle is approaching from behind at this point.

Since the subject motor vehicle 12 is to be accelerated to an exemplary speed of 90 km/h, but the other motor vehicle 28 is driving slower, the other motor vehicle 28 is no longer the most relevant road user for trajectory planning as soon as an overtaking maneuver is possible. The control system 10 therefore selects the further motor vehicle 40 as a reference (road user) for trajectory planning and calculates as described above an optimum trajectory $x^*_{ego}$ from the maneuver class lane change on the left (see the third and fourth images from the top in FIG. 14). The subject motor vehicle 12 then follows the further motor vehicle 40 in the fast lane on the basis of an optimum trajectory $x_{ego}$ from the maneuver class lane keeping in the center and overtakes the slower-moving other motor vehicle 28.

The speeds of the subject motor vehicle 12 in the individual situations (images) of FIGS. 13 and 14 are shown in FIG. 15. The overtaking maneuver shown in FIGS. 13 and 14 begins at a time t=8 s of FIG. 15 and ends at a time t=26 s of FIG. 15. As mentioned, there are two seconds between the individual images in FIGS. 13 and 14. As can be seen from FIG. 15, the subject motor vehicle can accelerate shortly before reaching t=26 s in order to achieve the desired (for example, predetermined by the driver assistance system 10) 90 km/h. This characterizes the overtaking process shown in the last two pictures (from the top) of FIG. 14, which is carried out by the subject motor vehicle 12.

The present disclosure deals with a control system (10) for sampling-based planning of candidate trajectories. Appropriate trajectory candidates 36 are generated and evaluated in real time. Lateral sampling is based on lateral basic maneuver classes. This makes use of the lane-discrete structure for semi-autonomous driving. In contrast to this lateral sampling of the lateral values in the state space, longitudinal samples (i.e. sampling values in the direction of travel) are generated from the (dynamic) action space, wherein the longitudinal acceleration of the subject motor vehicle 12 is used as a control parameter. Sampling efficiency is increased by the adaptive discretization.

The spline-based formulation of trajectories and their application in curvilinear coordinates offers the advantage that the control system 10 can (essentially) work in real time and can be used for both curved and straight road sections.

The two-stage approach to the planning and evaluation of trajectory candidates 36 is used to avoid collisions with trajectories of other road users who are in a current driving situation in the vicinity of the subject motor vehicle 12. These trajectories are also determined by the control system 10. In addition, the evaluation includes the required driving comfort and the feasibility of a possible optimum trajectory.

The lateral as well as the longitudinal driving characteristics of the subject motor vehicle 12 are not predetermined by a higher control system since this only provides a target state. The presented sampling and evaluation strategy therefore enables not only trajectory planning for lateral maneuvers such as lane changes, but also inherently the execution of other driving maneuvers such as following a vehicle ahead or the inflow into a lane where there is a smaller number of lanes.

It is understood that the exemplary embodiments explained above are not exhaustive and do not restrict the subject matter disclosed here. In particular, it is apparent to the person skilled in the art that he can combine the features of the different embodiments with each other and/or can omit various features of the embodiments without deviating from the subject matter disclosed here.

The invention claimed is:

1. A control system which is set up and designed for use in a subject motor vehicle traveling in a reference lane, based on environment data obtained from at least one environment sensor associated with the subject motor vehicle, to detect lanes including the reference lane, road boundaries, road markings, other motor vehicles and/or objects in a region in front of, laterally adjacent to and/or behind the subject motor vehicle, wherein the at least one environment sensor is set up and designed to provide an electronic controller of the control system with the environment data reflecting the region in front of, laterally adjacent to and/or behind the subject motor vehicle, and wherein the control system is at least set up and designed to,
  determine information relating to a current driving situation of the subject motor vehicle and at least one other motor vehicle on a basis of the environment data provided,
    determine a plurality of lateral positions based on the information relating to the current driving situation of the subject motor vehicle and/or the at least one other motor vehicle,
    determine a number of longitudinal positions and/or speeds based on the information relating to the current driving situation of the subject motor vehicle and/or the at least one other motor vehicle,
    sample the plurality of lateral positions in a static state space and the number of longitudinal positions and/or speeds in a dynamic action space in curvilinear coordinates and transform the curvilinear coordinates based on the reference lane recognized by the at least one environment sensor to determine stopping points for a trajectory for the subject motor vehicle, which the subject motor vehicle is to follow to carry out a driving maneuver,
    determine the trajectory for the subject motor vehicle utilizing a spline-based interpolation in orthogonal coordinates between the determined stopping points and corresponding to the lateral positions at the determined stopping points; and
  control the subject motor vehicle to execute at least a portion of the trajectory.

2. The control system as claimed in claim 1, which is further set up and designed to:
  determine a basic driving maneuver based on the provided environment data, which the subject motor vehicle is to carry out, and
  determine at least a plurality of lateral positions based on the determined basic maneuver and/or to assign at least one of the plurality of lateral positions a value that denotes a basic maneuver class, wherein the basic maneuver class is contained in a set of basic maneuver classes composed at least of basic maneuvers for a lane change to the left, a lane change to the right and lane keeping.

3. The control system of claim 1, which is further set up and designed to:
  determine the number of longitudinal positions based on a longitudinal acceleration of the subject motor vehicle and/or the other motor vehicle.

4. The control system of claim 1, which is further set up and designed to determine the number of longitudinal positions by means of adaptive discretization, wherein an acceleration of the subject motor vehicle and/or the other motor vehicle is used as a control parameter for the adaptive discretization.

5. The control system of claim 1, which is further set up and designed to carry out the determination of the trajectory for the subject motor vehicle taking into account a static collision check, wherein the static collision check is based on a number of lateral positions of the subject motor vehicle and/or the other motor vehicle.

6. The control system of claim 1, which is further set up and designed to determine the trajectory for the subject motor vehicle taking into account a dynamic collision check, wherein the dynamic collision check is based on the plurality of lateral positions and/or on the number of longitudinal positions and/or speeds.

7. The control system of claim 6, which is further set up and designed to carry out the dynamic collision check taking into account a maximum acceleration of the subject motor vehicle and/or the other motor vehicle.

8. The control system of claim 6, which is further set up and designed to perform the dynamic collision check using a separation theorem.

9. The control system of claim 1, which is further set up and designed to check the trajectory for the subject motor vehicle by means of a target function based on a cost function.

10. The control system of claim 9, wherein a target state is assigned to the target function, and wherein deviation(s) of the target function from the target state are used as targets of the target function.

11. The control system of claim 10, wherein further targets of the target function in a form of a lateral and/or longitudinal acceleration of the subject motor vehicle and/or in a form of a lateral and/or longitudinal jolt of the subject motor vehicle are used as target states of the target function.

12. A motor vehicle comprising a control system as claimed in claim 1.

13. A control method, which detects, in a subject motor vehicle and based on environment data from at least one environment sensor associated with the subject motor vehicle traveling in a reference lane, lanes, road boundaries, road markings, other motor vehicles and/or objects in a region in front of, laterally adjacent to and/or behind the subject motor vehicle, wherein the control method is carried out in a control system, and the control method includes at least the following steps:
  determining information relating to a current driving situation of the subject motor vehicle and of at least one other motor vehicle based on the environment data provided,
  determining a plurality of lateral positions based on the information regarding the current driving situation of the subject motor vehicle and/or of the at least one other motor vehicle,
  determining a number of longitudinal positions and/or speeds based on the information relating to the current driving situation of the subject motor vehicle and/or of the at least one other motor vehicle,
  sampling the plurality of lateral positions in a static state space and the number of longitudinal positions and/or speeds in a dynamic action space in curvilinear coordinates and transform the curvilinear coordinates based on the reference lane recognized by the at least one environment sensor to determine stopping points for a trajectory for the subject motor vehicle, which is to be followed by the subject motor vehicle when performing a driving maneuver, determining the trajectory for the subject motor vehicle utilizing a spline-based interpolation in orthogonal coordinates between the determined stopping points and according to the plurality lateral positions at the determined stopping points, and
controlling the subject motor vehicle to execute at least a portion of the trajectory.

* * * * *